(12) United States Patent
Desiraju et al.

(10) Patent No.: US 6,243,613 B1
(45) Date of Patent: Jun. 5, 2001

(54) N-DIMENSIONAL MATERIAL PLANNING METHOD AND SYSTEM WITH CORRESPONDING PROGRAM THEREFOR

(75) Inventors: Ramakrishna Desiraju, Chappaqua; Omer Bakkalbasi, Mahopac; Bor-Ruey Fu; Ray Krasinski, both of Ossining, all of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/002,026

(22) Filed: Dec. 31, 1997

(51) Int. Cl.[7] .................................................. G06F 19/00
(52) U.S. Cl. ........................ 700/104; 700/49; 700/96; 700/99; 700/103; 700/106; 705/4; 705/23; 705/29
(58) Field of Search .................... 700/48, 51, 97, 700/96, 98, 99, 102, 103, 104, 105, 106, 29; 705/7, 22–23, 8, 9, 16

(56) References Cited

U.S. PATENT DOCUMENTS

| | | | |
|---|---|---|---|
| 5,193,065 | * | 3/1993 | Guerindon et al. .................. 700/107 |
| 5,848,162 | * | 12/1998 | Tsumura ................................. 380/49 |
| 5,923,552 | * | 7/1999 | Brown et al. ......................... 700/102 |
| 5,930,156 | * | 7/1999 | Kennedy ................................. 700/99 |
| 5,963,911 | * | 10/1999 | Walker et al. ........................ 700/100 |
| 5,971,585 | * | 10/1999 | Dangat et al. ........................ 700/100 |
| 5,983,198 | * | 11/1999 | Mowery et al. ........................ 705/22 |
| 6,014,644 | * | 1/2000 | Erickson ................................ 705/37 |

* cited by examiner

Primary Examiner—Paul P. Gordon
Assistant Examiner—Ramesh Patel

(57) ABSTRACT

An N-dimensional material planning method for evaluating supplier material policy includes steps for storing supplier characterization data in a N-dimensional data space, and evaluating the supplier characterization data using predetermined rules to thereby generate at least one of a current policy assessment and a recommended policy goal. Moreover, the method includes a further step for analyzing the predetermined rules upon which the at least one of the current policy assessment and the recommended policy goal are based. According to an aspect of the present invention, the evaluating step uses predetermined rules including binary rules and weighting rules to generate the at least one of the current policy assessment and the recommended policy goal, where the binary rules have precedence over the weighting rules. A computer system and a storage medium for carrying out and storing computer readable instructions, respectively, pertaining to the N-dimensional material planning method are also described.

24 Claims, 33 Drawing Sheets

PART I. COMPONENT CHARACTERISTICS: THE CHARACTERISTICS INTRINSIC TO THE COMPONENT, REGARDLESS OF ITS SUPPLIER(S)

COMMODITY CODE/PART NUMBER: _____ DESCRIPTION _____
COMPLETED BY: _____ EXTENSION _____

*WHEN SELECTING AN ALTERNATIVE, PLEASE CHECK ONLY ONE BOX.*

1. WHAT IS THE COMPANY'S TOTAL ANNUAL MATERIAL COST FOR THIS COMPONENT? $ _____

2. WHAT IS THE COMPANY'S USAGE PATTERN FOR THIS SPECIFIC COMPONENT?

A) OVER THE MODEL YEAR (MONTH-BY-MONTH)

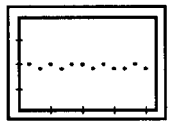 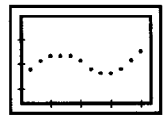 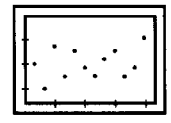
   ☐ REGULAR   ☐ MODERATELY VARIABLE   ☐ ERRATIC

B) WITHIN EACH MONTH (WEEK-BY-WEEK)

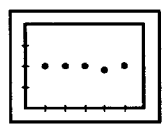 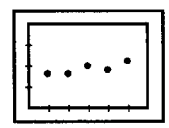 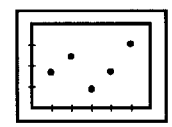
   ☐ REGULAR   ☐ MODERATELY VARIABLE   ☐ ERRATIC

C) PROJECTED TREND IN THE COMING YEARS

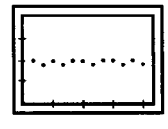 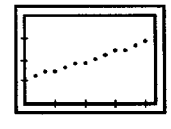 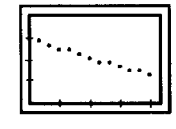
   ☐ CONSTANT   ☐ INCREASING   ☐ DECREASING

3. WHICH BEST DESCRIBES THE NATURE OF THE PART USAGE?
   ☐ COMMON TO ALL PRODUCT FAMILIES   ☐ COMMON WITHIN A PRODUCT FAMILY   ☐ UNIQUE

4. HOW SPECIALIZED IS THIS COMPONENT:   ☐ OFF-THE-SHELF-ITEM   ☐ COMPANY-SPECIFIC

5. ARE THERE ANY ALTERNATIVE SUPPLIERS FOR THIS COMPONENT (IN ADDITION TO THE SUPPLIER(S) CURRENTLY USED)
   ☐ NONE   ☐ A FEW   ☐ MANY

6. WHAT IS THE SCRAP ALLOWANCE (OVER-BUY) FOR THIS COMPONENT? (IF APPLICABLE) _____

7. WHAT IS THE MINIMUM SET-UP QUANTITY REQUIRED FOR THIS COMPONENT? _____

FIG. 2A

8. WHAT STAGE IN THE MANUFACTURING PROCESS IS THIS COMPONENT USED, AND HOW?

☐ CHASSIS-BUILDING    ☐ SUB-ASSEMBLY    ☐ FINAL ASSEMBLY
        ☐ AUTO-INSERTION    ☐ AUTO-INSERTION
        ☐ MANUAL INSERTION    ☐ MANUAL INSERTION

9. WHAT ARE THE HANDLING CHARACTERISTICS FOR THIS COMPONENT?

A) APPROXIMATE PHYSICAL DIMENSIONS OF    HEIGHT \_\_\_    LENGTH \_\_\_    WIDTH \_\_\_
       A STANDARD PACKAGED QUANTITY
       UNITY OF MEASUREMENT _____

B) QUANTITY OF COMPONENTS PER A STANDARD PACKAGE _____

C) IS SPECIALIZED HANDLING NEEDED FOR THIS COMPONENT? (E.G., COMPONENT IS NOT
       STORABLE FOR LONG TIME, SPECIALIZED MATERIAL HANDLING
       EQUIPMENT OR REUSABLE CONTAINERS ARE USED)    ☐ YES    ☐ NO
       IF YES, EXPLAIN _____

FIG. 2B

PART II: SUPPLIER CHARACTERISTICS: THE CHARACTERISTICS OF THE SUPPLIER WITHOUT REFERENCE TO ANY SPECIFIC COMPONENT

SUPPLIER NUMBER: _____  SUPPLIER NAME _____

COMPLETED BY: _____  EXTENSION _____

_____  _____

_____  _____

*WHEN SELECTING AN ALTERNATIVE, PLEASE CHECK ONLY ONE BOX.*

1. WHAT IS THE STAGE OF MATURITY OF PARTNERSHIP BETWEEN THE COMPANY AND THIS SUPPLIER?

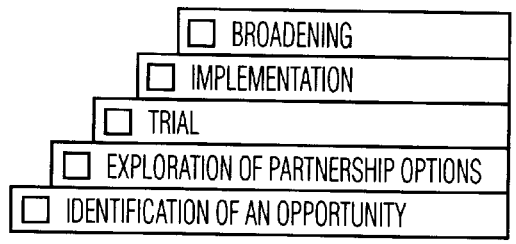  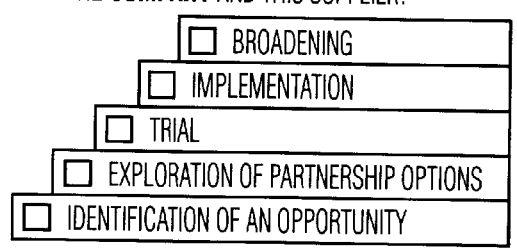

AT PRESENT                    IN FUTURE (TARGET DATE _____ )

2. WHAT IS THE DELIVERY PERFORMANCE OF THE SUPPLIER? (AS PERCENTAGE HITS)

AT PRESENT ____%   IN FUTURE ____%   (TARGET DATE _____ )

(A DELIVERY IS A "HIT" IF THE COMPONENTS ARE DELIVERED ON TIME, IN THE RIGHT QUANTITY OF ACCEPTABLE QUALITY)

3. WHAT IS THE TOTAL ANNUAL VOLUME OF ALL THE COMPONENTS THAT ARE PARCHASED FROM THIS SUPPLIER?

AT PRESENT   $ _____      TOTAL QUANTITY _____
   IN FUTURE    $ _____      TOTAL QUANTITY _____   (TARGET DATE _____ )

4. HOW MANY DIFFERENT PART NUMBERS (COMPONENT <u>TYPES</u>) DOES THIS SUPPLIER SUPPLY TO THE COMPANY?

AT PRESENT _____   IN FUTURE _____   (TARGET DATE _____ )

5. WHAT PERCENTAGE OF THIS SUPPLIER'S BUSINESS IS MADE UP OF THE COMPANY'S TOTAL PURCHASE?

AT PRESENT ____%   IN FUTURE ____%   (TARGET DATE _____ )

6. HOW WOULD YOU CHARACTERIZE THE SUPPLIER'S INFORMATION TECHNOLOGY CAPABILITIES?

AT PRESENT  ☐ POOR   ☐ GOOD   ☐ EXCELLENT
   IN FUTURE   ☐ POOR   ☐ GOOD   ☐ EXCELLENT   (TARGET DATE _____ )

7. DOES THE SUPPLIER HAVE AN ACTIVE EDI IMPLEMENTATION?   ☐ YES   ☐ NO
   IF YES, HOW MANY TRANSACTION SETS HAVE BEEN IMPLEMENTED? _____
   PLEASE LIST THE TRANSACTIONS:
   _____

8. HOW OPEN IS THE SUPPLIER TOWARDS DIFFERENT MUTUALLY BENEFICIAL PAYMENT SCHEMES?
   ☐ OUT OF THE QUESTION   ☐ MIGHT CONSIDER   ☐ VERY OPEN

FIG. 2C

*PART III: SUPPLIER-COMPONENT CHARACTERISTICS: THE CHARACTERISTICS RELATED TO THE COMPONENT BY THIS SUPPLIER*

SUPPLIER NUMBER: _____ SUPPLIER NAME
_____

COMMODITY/PART NUMBER: _____ DESCRIPTION
_____

COMPLETED BY: _____ EXTENSION _____
_____   _____

*WHEN SELECTING AN ALTERNATIVE, PLEASE CHECK ONLY ONE BOX.*

1. WHAT PERCENTAGE OF THIS COMPONENT'S USAGE REQUIREMENT IS SATISFIED BY THIS SUPPLIER?
   ____%

2. WHAT IS THE AVERGE UNIT PRICE OF THIS COMPONENT? $ _____ PER UNIT OF MEASURE _____

3. WHAT IS THE ANNUAL TOTAL AMOUNT PAID TO THIS SUPPLIER TOWARDS SUPPLYING THIS COMPONENT? $ _____

4. A. WHAT IS THE SUPPLIER'S TOTAL PRODUCTION RATE OF THIS COMPONENT PER ☐ DAY ☐ WEEK ☐ MONTH?
   MINIMUM _____ AVERAGE _____ MAXIMUM _____

B. WHAT IPERCENTAGE OF THIS SUPPLIER'S PRODUCTION RATE GOES TOWARDS SATISFYING THE COMPANY'S DEMAND?
   MINIMUM _____ % AVERAGE _____ % MAXIMUM _____ %

5. WHAT IS THE RESPONSE TIME TO SUPPLY FROM THE TIME OF CALL-OFF TO THE TIME OF FULL DELIVERY? THIS RESPONSE TIME IS AS DEFINED IN THE FOLLOWING FIGURE AND ESTIMATE MAY BE DIFFERENT FROM THE LEAD TIME ENTERED IN THE SUPPLIER PARAMETER FILE.

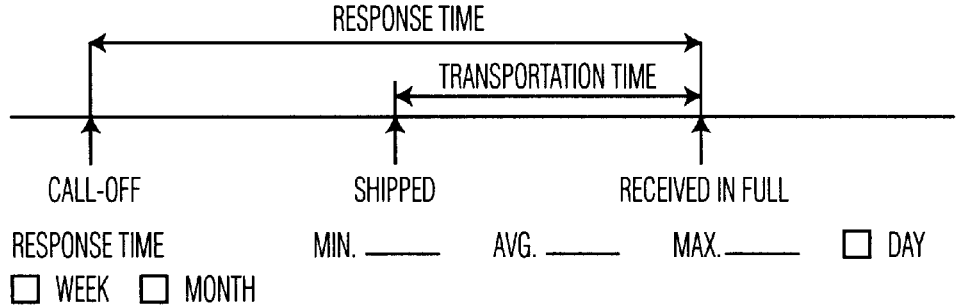

RESPONSE TIME      MIN. _____ AVG. _____ MAX. _____ ☐ DAY
☐ WEEK ☐ MONTH

6. WHAT IS THE AVERAGE TRANSPORTATION TIME (IN DAYS) TO SHIP THIS COMPONENT FROM THE SUPPLY POINT? (SEE ABOVE FIGURE)

FIG. 2D

| MODE OF TRANSPORT | STANDARD | PREMIUM |
|---|---|---|
| GROUND | | |
| SEA | | |
| AIR | | |

7. WHAT IS THE APPROXIMATE DISTANCE OF THE SHIPPING POINT ( ☐ DOMESTIC  ☐ FOREIGN) TO THE COMPANY'S RECEIVING?
　　　——— MILES

FIG. 2E

COMPONENT CHARACTERISTICS

COMMODITY CODE/PART NUMBER:
DESCRIPTION
COMPLETED BY:
EXTENSION
COMPLETED BY:
EXTENSION
COMPLETED BY:
EXTENSION

| FILLED INFORMATION | SUPPLIER ENPOWERMENT | | FINANCIAL ARRANGEMENT | | INFORMATION EXCHANGE | |
|---|---|---|---|---|---|---|
| | SCORE | WEIGHT | SCORE | WEIGHT | SCORE | WEIGHT |
| CCODE | | | | | | |
| CDESC | | | | | | |
| COMP1 | | | | | | |
| EXT1 | | | | | | |
| COMP2 | | | | | | |
| EXT2 | | | | | | |
| COMP3 | | | | | | |
| EXT3 | | | | | | |
| $1,000 | 1 | | | | | |
| REGULAR | 3 | 1 | | | 3 | 1 |
| MODERATELY VARIABLE | 2 | 1 | | | 2 | 1 |
| INCREASING | 2 | 1 | 2 | | 3 | 1 |
| COMMON TO ALL PRODUCT FAMILIES | 1 | 1 | 1.5 | 1 | 3 | 1 |
| OFF-THE-SHELF ITEM | 2 | 1 | | | | |
| A FEW | 2 | 1 | 2 | 1 | | 1 |
| 90% | | 1 | | 1 | | 1 |

CURRENT SCORE

1. WHAT IS PCEC'S TOTAL ANNUAL MATERIAL COST FOR THIS COMPONENT?
2. WHAT IS PCEC'S USAGE PATTERN FOR THIS SPECIFIC COMPONENT? a) OVER THE MODEL YEAR (MONTH-BY-MONTH)
b) WITHIN EACH MONTH (WEEK-BY-WEEK)
c) PROJECTED TREND IN TH COMING YEARS
3. WHICH BEST DESCRIBES THE NATURE OF THE PART
4. HOW SPECIALIZED IS THIS COMPONENT?
5. ARE THERE ANY ALTERNATIVE SUPPLIERS FOR THIS COMPONENT IN ADDITION TO THE SUPPLIER(S) CURRENTLY USED)
6. WHAT IS THE SCRAP ALLOWANCE (OVER-BUY) FOR THIS COMPONENT? (IF APPLICABLE)

FIG. 3A1

| Question | | | | | | |
|---|---|---|---|---|---|---|
| 7. WHAT IS THE MINIMUM SET-UP QUANTITY REQUIRED FOR THIS COMPONENT? | 100 | | | | | |
| 8. WHAT STAGE IN THE MANUFACTURING PROCESS IS THIS USED, AND HOW a) STAGE | CHASSIS | 2 | | | 1 | |
| b) INSERTION METHOD | MANUAL INSERTION | 1 | 1 | | 1 | 1 |
| 10. WHAT ARE THE HANDLING CHARACTERISTICS FOR THIS COMPONENT? UNIT OF MEASUREMENT | INCH | | 1 | | 1 | 1 |
| a) APPROXIMATE PHYSICAL DIMENSIONS OF A STANDARD PACKAGED QUANTITY (HEIGHT) | 20 | 1 | 1 | | 1 | |
| LENGTH | 30 | 1 | 1 | | 1 | 1 |
| WIDTH | 40 | 1 | 1 | | 1 | 1 |
| b) QUANTITY OF COMPONENTS PER A STANDARD PACKAGE | 200 | 1 | 1 | | 1 | |
| c) IS SPECIALIZED HANDLING NEEDED FOR THIS COMPONENT? COMPONENT IS NOT STORABLE FOR LONG TIME, SPECIALIZED MATERIAL HANDLING EQUIPMENT OR REUSABLE CONTAINERS ARE USED) | YES | 3 | 1 | | 1 | 1 |
| EXPLANATION | IF YES | | 1 | | 1 | 1 |
| GENERAL COMMENTS | GEN COMPO | | | | | |
| | WEIGHTED AVERAGE | 2.1 | 1.8 | | | 2.8 |
| COUNTS | JIT | 2 | SHARE REVENUES | 0 | EDI | 3 |
| | MIN/MAX | 5 | CONTRACT | 2 | DIALUP | 1 |
| | PO | 1 | NEGOTIATE | 0 | MAIL/PHONE | 0 |
| | TOTAL | 8.0 | TOTAL | 2.0 | TOTAL | 4 |

| SUPPLIER CHARACTERISTICS | | CURRENT SCORE | | | | | | |
|---|---|---|---|---|---|---|---|---|
| | FILLED INFORMATION | SUPPLIER ENPOWERMENT | | FINANCIAL ARRANGEMENT | | INFORMATION EXCHANGE | |
| | | SCORE | WEIGHT | SCORE | WEIGHT | SCORE | WEIGHT |
| SUPPLIER NUMBER | SNUMBER | | | | | | |
| SUPPLIER NAME | SNAME | | 1 | | 1 | | 1 |
| COMPLETED BY: | COMP1 | | 1 | | 1 | | 1 |
| EXTENSION | EXT1 | | 1 | | 1 | | 1 |
| COMPLETED BY: | COMP2 | | 1 | | 1 | | 1 |
| EXTENSION | EXT2 | | 1 | | 1 | | 1 |
| COMPLETED BY: | COMP3 | | 1 | | 1 | | 1 |
| EXTENSION | EXT3 | | 1 | | 1 | | 1 |
| 1. WHAT IS THE STAGE OF MATURITY OF PARTNERSHIP BETWEEN PCEC AND THIS SUPPLIER? A. AT PRESENT | BROADENING | 3 | 1 | 3 | 1 | 3 | 1 |
| B. IN FUTURE | EXPLORATION OF PARTNERSHIP OPTIONS | 1 | 1 | | 1 | 1 | 1 |
| TARGET DATE | 12-JUN | | | | | | |
| 2. WHAT IS THE DELIVERY PERFORMANCE OF THE SUPPLIER? (AS PERCENTAGE HITS) A. AT PRESENT | 12% | 1 | 1 | | 1 | | 1 |
| B. IN FUTURE | 200% | | 1 | | 1 | | 1 |
| TARGET DATE | 6/12/95 | | | | | | |
| 3. WHAT IS THE TOTAL ANNUAL VOLUME OF ALL THE COMPONENTS THAT ARE PURCHASED FROM THIS SUPPLIER? A. AT PRESENT ($) | $2,000 | | 1 | | 1 | | 1 |
| QUANTITY | 100 | | | | | | |
| B. IN FUTURE ($) | $3,000 | | 1 | | 1 | | 1 |
| QUANTITY | 150 | | | | | | |

| | | | | | |
|---|---|---|---|---|---|
| TARGET DATE | 30-JUL | | | | 1 |
| 4. HOW MANY DIFFERENT PART NUMBERS (COMPONENT TYPES) DOES THIS SUPPLIER SUPPLY TO PCEC? A. AT PRESENT | 20 | | | | |
| B. IN FUTURE | 200 | | | | 1 |
| TARGET DATE | 23-JUL | | | | 1 |
| 5. WHAT PERCENTAGE OF THIS SUPPLIER'S BUSINESS IS MADE UP OF PCEC'S TOTAL PURCHASES? A. AT PRESENT | 70.00% | 2 | | 2 | |
| B. IN FUTURE | 100.00% | | 2 | 1 | 1 |
| TARGET DATE | 12-JUN | | | | 1 |
| 6. HOW WOULD YOU CHARACTERIZE THE SUPPLIER'S INFORMATION TECHNOLOGY CAPABILITIES? A. AT PRESENT | POOR | | | 1 | |
| B. IN FUTURE | POOR | 1 | | 1 | 1 |
| TARGET DATE | 16-JUN | 1 | | 1 | 1 |
| 7. DOES THE SUPPLIER HAVE AN ACTIVE EDI IMPLEMENTATION? | YES | 1 | | 1 | 3 |
| IF YES, HOW MANY TRANSACTION SETS HAVE BEEN IMPLEMENTED? | 100 | | | | |
| PLEASE LIST THE TRANSACTIONS: | INVENTORY, MRP, ETC | | | 1 | |
| 8. HOW OPEN IS THE SUPPLIER TOWARDS DIFFERENT MUTUALLY BENEFICIAL PAYMENT SCHEMES? | OUT OF THE QUESTION | | 1 | | 1 |
| GENERAL COMMENTS: | GEN COMMENT 1 | | | | |
| | WEIGHTED AVERAGE | 1.8 | | 2.0 | 2.0 |
| | COUNTS | JIT 1 | SHARE REV 1 | 1 | EDI 2 |
| | | MIN/MAX 1 | CONTRACT 1 | 1 | DIALUP 2 |
| | | PO 2 | NEGOTIATE 1 | | MAIL/PHO 2 |
| | | TOTAL 4.0 | TOTAL | 3.0 | TOTAL 6 |

FIG. 3B2

SUPPLIER-COMPONENT CHARACTERISTICS

| FILLED INFORMATION | SUPPLIER EMPOWERMENT | | FINANCIAL ARRANGEMENT | | INFORMATION EXCHANGE | |
|---|---|---|---|---|---|---|
| | SCORE | WEIGHT | SCORE | WEIGHT | SCORE | WEIGHT |
| SNUMBER | | | | | | 1 |
| SNAME | | | | | | 1 |
| CNUMBER | | | 1 | | | 1 |
| CDESC | | | | | | 1 |
| COMP1 | | | 1 | | | 1 |
| EXT1 | | | 1 | | | 1 |
| COMP2 | | | 1 | | | 1 |
| EXT2 | | | 1 | | | 1 |
| COMP3 | | | 1 | | | 1 |
| EXT3 | | | 1 | | | 1 |
| 20.00% | 1 | | 1 | | | 1 |
| $30.00 | | | 1 | | | 1 |
| LB | | | | | | 1 |
| $2,000 | 1 | | 1 | | | 1 |
| DAY | | | | | | 1 |
| 15 | | | 1 | | | 1 |
| 20 | | | | | | 1 |
| 50 | | | | | | 1 |

SUPPLIER NUMBER
SUPPLIER NAME
COMMODITY CODE/PART NUMBER:
DESCRIPTION
COMPLETED BY:
EXTENSION
COMPLETED BY:
EXTENSION
COMPLETED BY:
EXTENSION
1. WHAT PERCENTAGE OF THIS COMPONENT'S USAGE REQUIREMENT IS SATISFIED BY THIS SUPPLIER?
2. WHAT IS THE AVERAGE UNIT PRICE OF THIS COMPONENT? UNIT OF MEASURE
3. WHAT IS THE ANNUAL TOTAL AMOUNT PAID TO THIS SUPPLIER TOWARDS SUPPLYING THIS COMPONENT?
4. a. WHAT IS THE SUPPLIER'S TOTAL PRODUCTION RATE OF THIS COMPONENT PER
MINIMUM
AVERAGE
MAXIMUM

FIG. 3C1

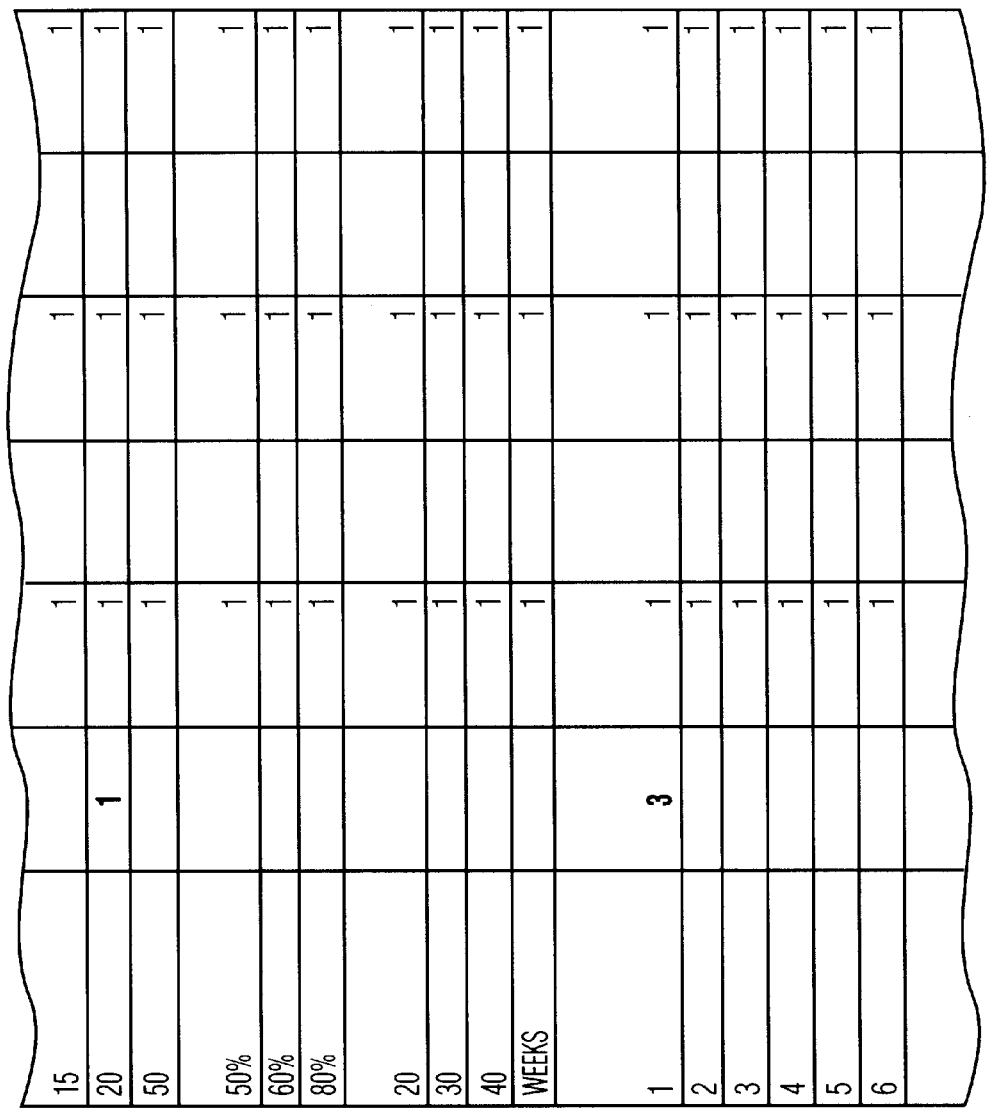
FIG. 3C2

| | | | | |
|---|---|---|---|---|
| DOMESTIC | | | 1 | 1 |
| 200 | | | 1 | 1 |
| GEN COMMENTS | | | | |
| WEIGHTED AVERAGE | | 1.5 | 0.0 | 0.0 |
| COUNTS | JIT | 1 | SHARE REVEN | 0 | EDI | 0 |
| | MIN/MAX | 0 | CONTRACT | 0 | DIALUP | 0 |
| | PO | 3 | NEGOTIATE | 0 | MAIL/PHONE | 0 |
| | TOTAL | 4 | TOTAL | 0 | TOTAL | 0 |

7. WHAT IS THE APPROXIMATE DISTANCE OF THE SHIPPING POINT TO PCEC'S RECEIVING?

MILES:

GENERAL COMMENTS

| | SUPPLIER ENPOWERMENT | | FINANCIAL ARRANGEMENT | | INFORMATION EXCHANGE | |
|---|---|---|---|---|---|---|
| WEIGHTED AVERAGE | | 1.9 | | 1.9 | | 2.3 |
| COUNTS | JIT | 4 | SHARE REVEN | 1 | EDI | 5 |
| | MIN/MAX | 6 | CONTRACT | 3 | DIALUP | 3 |
| | PO | 6 | NEGOTIATE | 1 | MAIL/PHONE | 2 |
| | TOTAL | 16 | TOTAL | 5 | TOTAL | 10 |

FIG. 3C3

| MENU | SUB-MENU | TOOLBAR BUTTON | DESCRIPTION |
|---|---|---|---|
| FILE | OPEN |  | OPEN A *MATPLAN* DATA FILE |
| | SAVE |  | SAVE THE CURRENT *MATPLAN* DATA FILE |
| | SAVE AS | | SAVE THE *MATPLAN* DATA FILE UNDER A USER-SPECIFIED NAME |
| | IMPORT |  | IMPORT EXTERNAL DATA |
| | OPTIONS | | SET THE DATA DIRECTORY |
| | EXIT |  | EXIT *MATPLAN* |
| MAINTAIN | WEIGHTS |  | MAINTAIN THE WEIGHTS FOR THE VARIOUS QUESTIONS |
| | SUPPLIER DATA |  | EDIT DATA CORRESPONDING TO SELECTED SUPPLIER(S) |
| | COMPONENT DATA |  | EDIT DATA CORRESPONDING TO SELECTED COMPONENT(S) |
| | SUPPLIER-COMPONENT DATA |  | EDIT DATA CORRESPONDING TO SELECTED SUPPLIER-COMPONENT PAIR(S) |
| | RESPONSE |  | EDIT RESPONSES TO QUESTIONS |
| | RECOMMENDATIONS |  | REVIEW, DRILL DOWN, ACCEPT OR OVERRIDE RECOMMENDATIONS |
| ANALYZE | CURRENT |  | ANALYZE CHOSEN SUPPLIER-COMPONENT PAIR(S) |
| REPORT | RESPONSES |  | REPORT RESPONSES |
| | RULES |  | REPORT BINARY AND WEIGHING RULES |

FIG. 10

| TABLE NAME | USAGE |
|---|---|
| BINARY RULE LIST* | LIST OF *MATPLAN* BINARY RULES |
| CATEGORY LIST* | LIST OF CATEGORIES FOR EACH DIMENSION |
| CHOICE LIST* | LIST OF CHOICES FOR VARIOUS QUESTIONS |
| COMPONENT LIST | LIST OF COMPONENTS AS SUPPLIED BY THE SUPPLIERS |
| FIRED RULE LIST* | LIST OF FIRED RULES IN LAST ANALYZE FUNCTION |
| HIGH-LOW LIST† | LIST OF HIGH AND LOW THRESHOLD VALUES FOR VARIOUS QUESTIONS |
| IMPORT LINK LIST* | LIST OF FIELDS IN LAST PARTIAL IMPORT SELECTION |
| QUESTION LIST† | LIST OF QUESTIONS, CORRESPONDING QUESTION TYPES AND PRIORITIES |
| RESPONSE LIST | LIST OF RESPONSES FOR EACH QUESTION FOR EACH SUPPLIER-COMPONENT PAIR |
| SUPPLIER LIST | LIST OF SUPPLIER RELATED DATA ITEMS |
| SUPPLIER-COMPONENT LIST | LIST OF SUPPLIER-COMPONENT RELATED DATA ITEMS |
| WEIGHTING RULE LIST | LIST OF *MATPLAN* EXPERT SYSTEM WEIGHTING RULES |

\* TABLES CANNOT BE EDITED USING *MATPLAN* FUNCTIONS.
† ONLY PORTION OF THE FIELDS IN THE TABLE CAN BE EDITED USING *MATPLAN* FUNCTIONS.

FIG. 11

| Maintain Supplier Data | | | | | |
|---|---|---|---|---|---|
| Supplier List | | | | | |
| Supplier List | SupplierName | Score2_1 | Score2_2 | Score2_3 | S |
| 199710 | CONDUCTIVE RUBI | 0 | 0 | 0 | |
| 201441 | CONSOLIDATED EL | 0 | 0 | 0 | |
| 331832 | FOSTER ELECTRIC | 0 | 0 | 0 | |
| 420992 | HOBSON BROS | 0 | 0 | 0 | |
| 471097 | H.C. JAUCH | 0 | 0 | 0 | |
| 482693 | JUDD WIRE | 0 | 0 | 0 | |
| 495740 | KIBSGAARD INDUS | 0 | 0 | 0 | |
| 505624 | KOA SPEER ELECT | 0 | 0 | 0 | |
| 537289 | LONGWELL C/O PI- | 0 | 0 | 0 | |

Supplier List Table

FIG. 13A

| Maintain Component Data | | | |
|---|---|---|---|
| Component List | | | |
| ComponentID | ComponentName | PrimarySupplierID | SecondarySup |
| G 1474300008 | SPEAKER GRILLE | 70087 | |
| G 1523530001 | NAMEPLATE-SMAL | 495740 | |
| G 1609100004 | RELAY POWER | 668322 | |
| G 1815330001 | INSULATOR | 788578 | |
| G 2005660006 | TERM. WRAP ARO | 852472 | |
| G 2302821045 | RCF .5W 100K P | 505624 | |
| G 2302823335 | RCF .5W 33K PM | 505624 | |
| G 3302720027 | CRT A63AFW36X | 700742 | |
| G 3302900026 | CRT A68AGN32X | 700742 | |

Component List Table

FIG. 13B

| Maintain Supplier-Component Data | | | | |
|---|---|---|---|---|
| Supplier-Component List | | | | |
| SupplierID | ComponentID | Score1_1 | Score1_2 | Score1_3 |
| 199710 | M 6473680001 | 0 | 0 | 0 |
| 199710 | M 6474410001 | 0 | 0 | 0 |
| 201441 | G 4613980009 | 0 | 0 | 0 |
| 331832 | G 5803250006 | 0 | 0 | 0 |
| 331832 | G 5870071003 | 0 | 0 | 0 |
| 420992 | G 7316650008 | 0 | 0 | 0 |
| 420992 | L 1816490004 | 0 | 0 | 0 |
| 471097 | G 5604450005 | 0 | 0 | 0 |
| 471097 | S 5604440040 | 0 | 0 | 0 |

FIG. 13C

| Maintain Response | | | |
|---|---|---|---|
| Response List | | | |
| SupplierID | ComponentID | QuestionID | Response_Numb |
| 199710 | M 6473680001 | 1.1A | |
| 199710 | M 6473680001 | 1.1B | 448 |
| 199710 | M 6473680001 | 1.2A | |
| 199710 | M 6473680001 | 1.2B | |
| 199710 | M 6473680001 | 1.2C | |
| 199710 | M 6473680001 | 1.3A | |
| 199710 | M 6473680001 | 1.3B | |
| 199710 | M 6473680001 | 1.4 | |
| 199710 | M 6473680001 | 1.5 | |

| Supplier: H.C. JAUCH | | | | |
|---|---|---|---|---|
| Information Exchange: Dimension 2 | | | Current | Recommended / User Choice |
| | Weighted Rules | Binary Rules | | |
| Mail / Phone / Fax | 0.5782 | 1 | ○ | ⊙ |
| Dial-in | 0.2642 | 0 | ⊙ | ○ |
| EDI | 0.5258 | 1 | ○ | ○ |
| | | | | Make Current |
| Financial Arrangement: Dimension 3 | | | Current | Recommended / User Choice |
| | Weighted Rules | Binary Rules | | |
| Perpetual Negotiation | 0.2442 | 0 | ○ | ○ |
| Long Term Contract | 0.3959 | 0 | ○ | ○ |
| Shared Risk & Revenue | 0.4800 | 0 | ⊙ | ⊙ |
| | | | | Make Current |
| | | | | Close |

| SupplierID | ComponentID | Effecte | RuleID | Value | LHS_Fund | LHS | Op | RHS_F | RHS |
|---|---|---|---|---|---|---|---|---|---|
| 471097 | S 5604440040 | 2.3 | 04 | 1 | RESPONSE | 2.7A | = | CHOIC | 1 |
| 471097 | S 5604440040 | 2.3 | 18 | 1 | RESPONSE | 2.1A | = | CHOIC | 1 |

FIG. 16

12/2/96    2 of 2+    Total: 155    100%

| QID | Wt | QuestionDescription | Choic |
|---|---|---|---|
| 2.6 | 10 | How would you characterize the supplier's present information technology capabilities? | [Poo |
| 2.7A | 9 | Does the supplier have an active EDI implementation? Yes___ No___ | |
| 2.8 | 3 | How open is the supplier towards different mutually beneficial payment schemes? [=out of th | |
| 2.9A | | Is supplier ISO certified? Yes=___ No=___ | |
| 2.9G | | Is supplier an......internal supplier?___ or external supplier?___ | |
| 3.0 | 5 | How specialized is this component? The component is.....an off-the-shelf item ___, inc | |
| 3.1 | 3 | How is this component sourced? [Single Sourced? Dual-Sourced? Multi-sourced?] | |

FIG. 17

| Supplier: H.C. JAUCH | Component: CRYSTAL | | | | ☒ |
|---|---|---|---|---|---|

Information Exchange: Dimension 2

| | Weighted Rules | Binary Rules | Current | Recommended / User Choice |
|---|---|---|---|---|
| Mail / Phone / Fax | 0.5782 | 1 | ○ | ⦿ |
| Dial-in | 0.2642 | 0 | ○ | ○ |
| EDI | 0.5258 | 1 | ⦿ | ○ |

Make Current

Financial Arrangement: Dimension 3

| | Weighted Rules | Binary Rules | Current | Recommended / User Choice |
|---|---|---|---|---|
| Perpetual Negotiation | 0.2442 | 0 | ○ | ○ |
| Long Term Contract | 0.3959 | 0 | ○ | ○ |
| Shared Risk & Revenue | 0.4800 | 0 | ⦿ | ⦿ |

Make Current

Replenishment Policy: Dimension 1

| | Weighted Rules | Binary Rules | Current | Recommended / User Choice |
|---|---|---|---|---|
| Individual Orders | 0.2548 | 0 | ○ | ○ |
| Min/Max Replenishment | 0.4754 | 0 | ⦿ | ⦿ |
| Just In Time Replenishment | 0.3044 | -1 | ○ | ○ |

Make Current

Close

FIG. 20

| | | 1 | 2 | 3 |
|---|---|---|---|---|
| | | Low | Medium | High |
| Replenishment Policy | Basic MRP | 60 | 0 | 0 |
| | Min / Max | 30 | 60 | 30 |
| | JIT | 10 | 40 | 70 |
| Information Exchange | Mail / Phone / Fax | 0 | 0 | 0 |
| | Dial-In | 0 | 0 | 0 |
| | EDI | 0 | 0 | 0 |
| Financial Arrangement | Negotiation | 60 | 10 | 10 |
| | Contract | 30 | 30 | 30 |
| | Shared Revenue | 10 | 60 | 60 |

Maintain Weight

Question: 1.1A    Question Weight: 9

Description: What is PCEC's total annual material cost for this component?

Category Weight Table    Weight: [ ]

FIG. 21

| High-Low List | | | |
|---|---|---|---|
| QuestionID | Index | Low | High |
| 1.1A | 1 | 100000 | 10000000 |
| 1.1B | 2 | 500000 | 10000000 |
| 1.5 | 9 | 0 | 0 |
| 2.3 | 19 | 1500000 | 20000000 |
| 2.4A | 20 | 2 | 4 |
| 2.4B | 21 | 10 | 100 |
| 2.5 | 22 | 20 | 60 |
| 3.1 | 36 | 40 | 100 |
| 3.2A | 37 | 10 | 100 |
| 3.3 | 39 | 100000 | 1000000 |

N-DIMENSIONAL MATERIAL PLANNING METHOD AND SYSTEM WITH CORRESPONDING PROGRAM THEREFOR

BACKGROUND OF THE INVENTION

The present invention relates generally to material planning systems. More specifically, the present invention relates to material planning systems wherein the relationship between the user's plant and a plurality of material suppliers is represented in a N dimensional space. Advantageously, a corresponding system and software programs for converting a general purpose computer into a multi-dimensional material planning system are also disclosed.

Numerous plants and factories are trying to establish material planning policies with suppliers to support make-to-order manufacturing environments, particularly those plants in the consumer electronics industry endeavoring to establish successful development and implementation of novel and efficient "quick response" logistics practices with major retailers. Many companies have already spent significant effort in raising awareness about the importance of a material planning process tightly integrated with their factory scheduling process. Many of these companies have also identified candidate policies, e.g., just in time (JIT) material shipments, as well as variables upon which to build these policies, e.g., usage for each part, delivery lead time for each part, supplier flexibility, etc. At the same time, it has been difficult to develop a unified framework under which all material requirements can be planned, ordered and delivered. In particular, factories having a strategic goal of "payment-to-suppliers-upon-use" often require amendments to their existing material planning policies.

Planning material to support make-to-order manufacturing with policies such as "payment-to-suppliers-upon-use" is more than an information technology issue. In particular, it demands considerable innovation in developing a mutually optimized procurement process, linking it to the scheduling process, and managing the financial data. The required functionality does not exist in off-the-shelf plug-in software.

Several approaches to material issues have been developed over the years. U.S. Pat. No. 4,887,218 to Natarajan discloses methods for optimizing production planning. The methods require entry of manufacturing characteristics and management priorities and generates performance metrics and a production release plan. U.S. Pat. No. 4,887,218 is based on enumeration/search methodology and simulation. In contrast, U.S. Pat. No. 5,233,533 to Edstrom et al. discloses methods for controlling production scheduling/loading based on supplied manufacturing characteristics and assigned due dates. Using heuristic finite backward/forward scheduling and dynamic resource selection, the program generates an optimum day-to-day operations schedule. Furthermore, U.S. Pat. No. 5,446,890 to Renslo et al. discloses a method of product demand forecasting using established demand history and knowledge based systems and simulation.

A somewhat different approach is disclosed by U.S. Pat. No. 5,608,621 to Caveney et al., which discloses a computer system including a memory, a processor, an input and an output. The computer system receives part data and forecast data for each part in an inventory, including the number of units in the inventory, the cost, and the forecast unit demand. The computer system uses the part data and forecast data for each part to optimize the number of units of each part in the inventory for a selected inventory investment or service level constraint. Moreover, the computer system optimizes the number of units of each part in the inventory by determining the number of units for each part for which the marginal increase in the number of orders for the part filled from the inventory for each additional order stocked is equal to the marginal increase for every other part and for which either the inventory service level equals the service level constraint or the inventory investment equals the inventory investment constraint. The computer system then outputs a determined minimum unit replenishment quantity and a safety unit quantity for each part. The minimum unit replenishment quantities and the safety unit quantity are used to determine the number of units of each part used to resupply the inventory. All of the patents mentioned above are incorporated herein by reference for all purposes.

What is needed is a material planning system and corresponding method which facilitates material procurement and purchasing planning. Moreover, what is needed is a material planning system and corresponding method which utilizes supplier data and material data and which operates in accordance with predetermined rules. Advantageously, a portion of the predefined rules can be controlled by the system user. Furthermore, a material planning system and corresponding method which not only displays an optimum supply policy for each purchased part but also displays the rationale behind the selected supply policy would be extremely desirable.

SUMMARY OF THE INVENTION

Based on the above and foregoing, it can be appreciated that there presently exists a need in the art for a material planning system and corresponding method which overcomes the above-described deficiencies. The present invention was motivated by a desire to overcome the drawbacks and shortcomings of the presently available technology, and thereby fulfill this need in the art.

The present invention represents a methodology embodied in a set of computer software tools for profiling supplier capabilities and material requirements so as to determine optimum supply policy. Moreover, the present invention encompasses a computer system for profiling supplier capabilities and material requirements so as to determine and display optimum supply policy along with the underlying rationale behind the selected policy. Advantageously, the computer system and corresponding operating method employ an N-dimensional data space for profiling supplier capabilities; optimum supply policies for each part represent the intersection of a surface with the N-dimensional data space.

One object of the present invention is to provide a material planning system and corresponding method which reduces asset deployment through substitution of physical material inventory with information.

Another object according to the present invention is to provide a material planning system and corresponding method which increases asset utilization through proper deployment of "payment-to-suppliers-upon-use" strategy.

Still another object according to the present invention is provide a material planning system and corresponding method which reduces supplier administrative costs when the suppliers schedule themselves.

Yet another object according to the present invention is to provide a material planning system and corresponding method which reduces "expediting" events by the factory through generation of smoother delivery schedules.

Another object according to the present invention is to provide a material planning system and corresponding method which provides the factory with an opportunity to establish and/or nurture longer-term partnerships with its suppliers.

An object according to the present invention is to provide a material planning system and corresponding method which permits enhanced flexibility through guaranteed inventory consignment.

These and other objects, features and advantages according to the present invention are provided by a storage medium which stores computer readable instructions for permitting a computer to store supplier characterization data in an N dimensional data space and to evaluate the supplier characterization data to thereby generate at least one of a current supply policy assessment and a recommended supply policy goal. According to one aspect of the present invention, the at least one of the current supply policy assessment and the recommended supply policy goal can be displayed as an intersection between the N dimensional data space and a surface. Preferably, the surface comprises a plane. According to another aspect of the present invention, the storage medium is a hard drive disposed in a computer.

These and other objects, features and advantages according to the present invention are provided by a storage medium which stores computer readable instructions for permitting a computer to store supplier characterization data in an N dimensional data space, to evaluate the supplier characterization data to thereby generate at least one of a current supply policy assessment and a recommended supply policy goal, to display selected portions of the supplier characterization data indicative of the generated the at least one of a current supply policy assessment and the recommended supply policy goal in responsive to user commands. According to one aspect of the present invention, the storage medium is a hard drive located remote from a computer displaying the at least one of the current supply policy assessment and the recommended supply policy goal as an intersection between the N dimensional data space and a surface.

These and other objects, features and advantages according to the present invention are provided by an N-dimensional material planning method for evaluating supplier material policy, comprising steps for storing supplier characterization data in a N-dimensional data space, and evaluating the supplier characterization data using predetermined rules to thereby generate at least one of a current policy assessment and a recommended policy goal. Moreover, the method advantageously includes a further step for analyzing the predetermined rules upon which the at least one of the current policy assessment and the recommended policy goal are based. According to one aspect of the present invention, the evaluating step comprises evaluating the supplier characterization data using predetermined rules including binary rules and weighting rules to thereby generate the at least one of the current policy assessment and the recommended policy goal. Preferably, the binary rules have precedence over the weighting rules.

These and other objects, features and advantages according to the present invention are provided by a 3-dimensional material planning method for evaluating supplier material policy, comprising steps for:

storing supplier characterization data in a 3-dimensional data space;
evaluating the supplier characterization data using predetermined rules to thereby generate at least one of a current policy assessment and a recommended policy goal; and
displaying related ones of the predetermined rules corresponding to the at least one of the current policy assessment and the recommended policy goal.

These and other objects, features and advantages according to the present invention are provided by a computer system implementing an N-dimensional material planning method for evaluating supplier material policy, comprising:

a device for storing supplier characterization data in a N-dimensional data space; and
a device for evaluating the supplier characterization data using predetermined rules to thereby generate at least one of a current policy assessment and a recommended policy goal. The computer system preferably also includes a device for analyzing the predetermined rules upon which the at least one of the current policy assessment and the recommended policy goal are based.

These and other objects, features and advantages according to the present invention are provided by a computer system performing a 3-dimensional material planning method for evaluating supplier material policy responsive to stored computer readable code. Preferably, the computer system includes:

a first device which stores supplier characterization data in a 3-dimensional data space;
a second device which evaluates the supplier characterization data using predetermined rules to thereby generate at least one of a current policy assessment and a recommended policy goal; and
a third device which displays related ones of the predetermined rules corresponding to the at least one of the current policy assessment and the recommended policy goal.

According to an aspect of the inventive computer system, the system additionally includes:

a fourth device which graphically displays the at least one of the current supply policy assessment and the recommended supply policy goal,
wherein:
the at least one of the current supply policy assessment and the recommended supply policy goal is displayed on the fourth device as an intersection between the 3 dimensional data space and a planar surface,
the second device evaluates the supplier characterization data using predetermined rules including binary rules and weighting rules to thereby generate the at least one of the current policy assessment and the recommended policy goal, and
the binary rules have precedence over the weighting rules.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 2A, 2B, 2C, 2D and 2E collectively illustrate an exemplary form by which supplier characterizing data can be collected for entry into an N-dimensional data space;

FIGS. 3A1–3C3 collectively illustrate the tabulation of supplier characterization data for a selected part, which characterization data was collected using the form illustrated in FIGS. 2A–2E;

FIG. 10 is a table which is useful in understanding the icons depicted in FIG. 5;

FIG. 11 is a table illustrating both the lists into which the characterizing data is organized and the access rights to each of the lists;

FIGS. 13A, 13B, 13C and 3D are computer screen window illustrations depicting maintenance of the lists shown in FIGS. 11 and 12;

FIG. 15 illustrates a computer screen window in which the underlying rules upon which the results depicted, in FIG. 14 are generated;

FIG. 16 illustrates a computer screen window which identifies supplier characterizing data associated with the rules depicted in FIG. 15;

FIG. 17 illustrates a computer screen window providing a compilation of the supplier characterization data stored in the N dimensional data space;

FIG. 20 illustrates a computer screen window in which the underlying rules upon which the results depicted in FIG. 19 are generated;

FIG. 21 illustrates a computer screen window which is useful in editing the weighting applied to selected portions of the supplier characterization data;

DETAILED DESCRIPTION OF THE PREFERRED EMBODIMENTS

The N-dimensional material planning method and corresponding system according to the present invention provide a decision support method and system which assists the user in identifying relevant material planning policies for the various suppliers of the components used in a manufacturing plant. The material planning policies for the suppliers are determined based on three basic dimensions that correspond to material, information and cash flows. More specifically, these three basic dimensions denote replenishment policy, information exchange, and financial arrangement. Based on the input data corresponding to the characteristics of the suppliers and components, the N-dimensional material planning method and corresponding system identifies the most appropriate of the three choices on each of these three dimensions. The dimensions and the options are graphically represented in FIG. 1.

Figure 1:
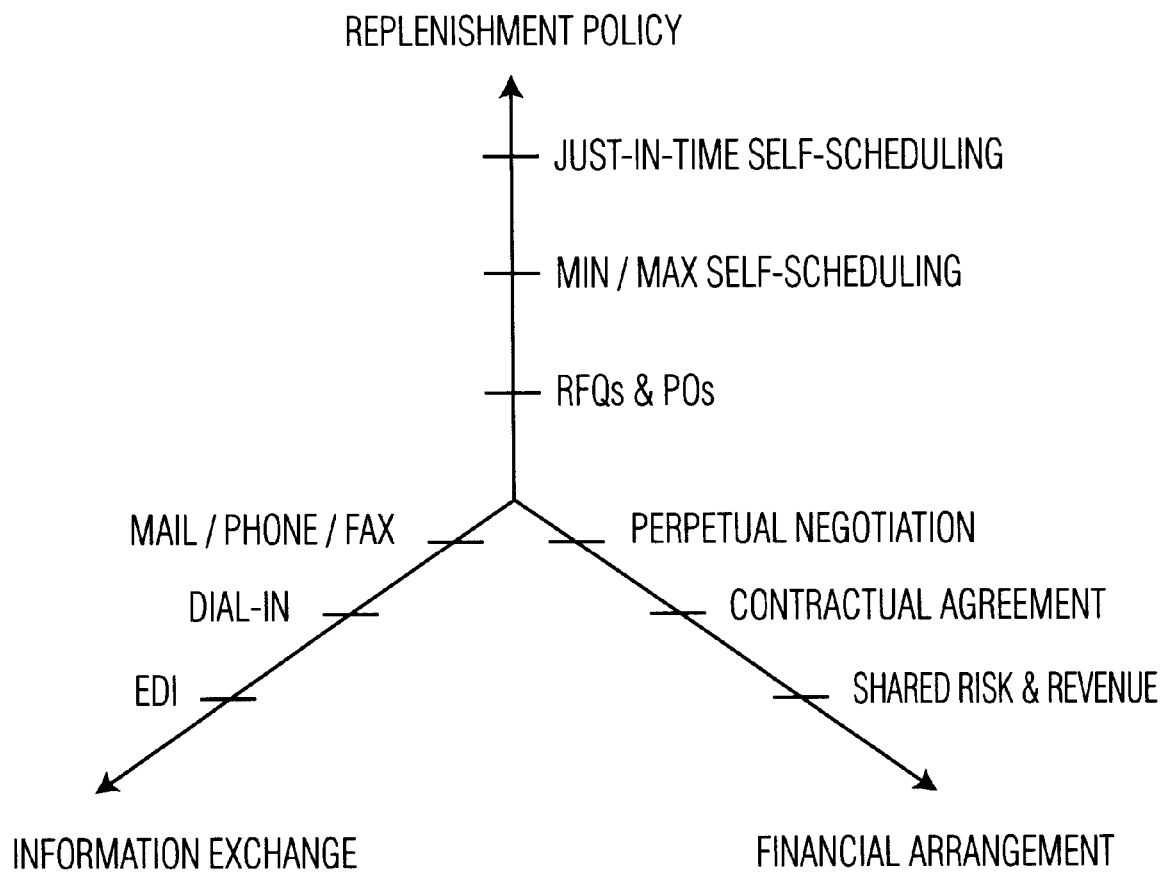
FIG. 1 is a representational diagram of an N-dimension space which advantageously can be used to characterize suppliers.

As shown in FIG. 1, in order to implement differentiated processes with different supplier categories consistently, there are three basic dimensions with which parts suppliers can be characterized, i.e., implemented replenishment policy, information exchange capability, and financial arrangement. Preferably, the intersections of the three dimensional axes defines an origin point, i.e., point (0,0,0). It will be appreciated from FIG. 1 that as a supplier characterization moves from the origin along one of the dimensional axes, that supplier is characterized as being more or less suitable from the manufacturer's point of view. For example, all suppliers with just in time (JIT) replenishment policies would be assigned a higher rating than a supplier geared to respond only to a request for quotation (RFQ) and/or a formal purchase order. Likewise, a supplier who can connected to the manufacturer by electronic data interchange (EDI) would receive a higher rating that a comparable supplier who relies on mail and facsimile transmissions for receipt of orders.

More specifically, the three levels which were implemented, in an exemplary case, with respect to replenishment policy are:

(1) Individual orders—at this level of logistics practice, suppliers are asked, usually at irregular intervals, to supply consumable items by individual purchase orders;

(2) Min/Max self-empowerment—at this level of logistics practice, suppliers are empowered to replenish the manufacturer's inventories with some flexibility in the replenishment quantities and schedule, where the flexibility limits are set by the manufacturer in close negotiation with the individual suppliers; and (3) Just-In-Time (JIT) self-empowerment—at this level of logistics practice, the supplier is empowered to deliver the appropriate quantity at regular and frequent intervals to meet the Company's actual demand of the supplied part.

It will be appreciated that through appropriately designed policies and implementation procedures, supplier empowerment on the replenishment policy dimension can lower inventories, reduce administrative costs, nurture long-term relationships with suppliers, and decrease response times.

Furthermore, the three level of information exchange policy implemented in an exemplary case are:

(1) FAX/Phone/Mail—utilizes conventional means to exchange information;

(2) Dial-in—this level supports a free-format electronic medium through electronic mail or by secured remote access/dial-in; and (3) EDI—at this level, standard protocols such as Electronic Data Interchange (EDI), Internet Protocol (IP), Hypertext Transfer Protocol (HTTP), or services such as CommerceNet are available to the supplier.

It should be mentioned that moving up along this dimension can improve accuracy, decrease response times, reduce administrative costs, and nurture long-term relationships with suppliers. Improved information exchange modes will also facilitate information exchange with higher information content, e.g., long-term production plans.

In addition, the three levels associated with financial arrangement policy implemented in the exemplary case under consideration are:

(1) Perpetual Negotiation—in this conventional setting, there is a continual negotiation over the unit price;

(2) Contractual Agreement—at this level, the supplier agrees to deliver consumable items according to a long-term contractual agreement that may consider issues in addition to the unit price; and (3) Shared Risk and Revenue—at this level, the supplier and the Company share the risk and revenue by identifying win-win situations balancing such factors as reduced administrative costs, and improved cash flows, all of which tend to nurture long-term relationships with suppliers.

Figure 4:
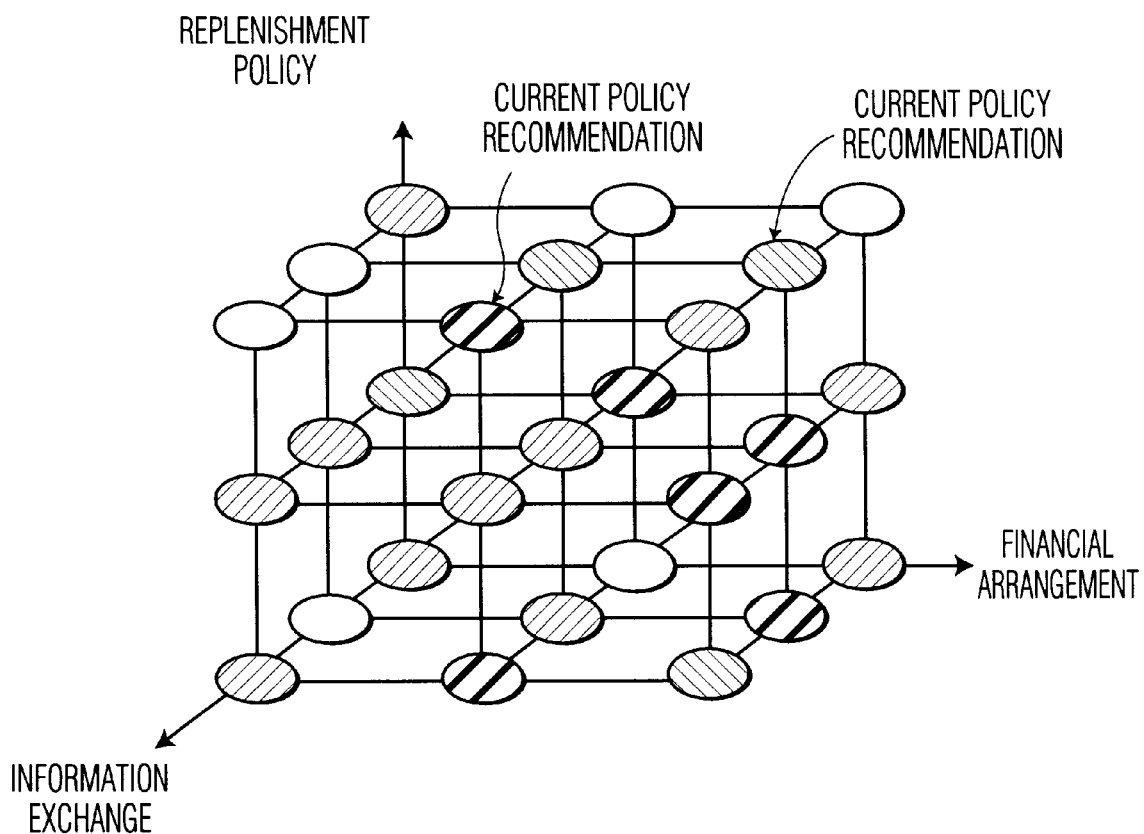
FIG. 4 depicts a graphical representation of present and future recommended supply policies based on tabulated data illustrated in FIGS. 3A, 3B and 3C.

Preferably, the characterization data required for each supplier, and each component provided by a particular supplier, are collected using, for example, the query form collectively illustrated in FIG. 2A–2E. Moreover, the collected supplier characterization data is organized, as illustrated in FIGS. 3A1–3C3, for entry into the data space associate with the N-dimensional material planning method and corresponding system. For the supplier characterization data entered into the N-dimensional data space, all possible combinations of these characteristics are illustrated in FIG. 4. It will be appreciated from FIG. 4 that the N-dimensional data space includes both a point representing the current material policy of the supplier and the optimum material policy. However, this latter point will not be identified until after the N-dimensional material planning method has been completed, as discussed in greater detail below.

More specifically, employing both rule and weight based algorithms, the N-dimensional material planning method and corresponding system analyzes the input data to determine the most appropriate levels on each of the three identified dimensions. The N-dimensional material planning method then graphically represents the current options in place for each of the three dimensions, and displays both present and recommended policies. It will be appreciated from FIG. 5 that the present and recommended policies are represented by the intersection of a surface, e.g., a plane, with the characterization data space. As will be discussed in greater detail below, the user advantageously can interactively review the recommendations, drill-down, i.e., review, the rules behind the recommendations, and accept or override the recommendations.

A broad overview of the user interface employed in the N-dimensional material planning method and corresponding system will now be discussed while referring to FIGS. 5–9. As specifically illustrated in FIG. 5, the list of suppliers and the components supplied by them are displayed in a Treeview, which is analogous to the directory (folder) and file (leaf) structure shown in the Windows File Manager. At the highest level, the upper folder represents all of the suppliers. Within this first-level folder, the suppliers are shown as sub-folders, each supplier having a single sub-folder. Within the sub-folder of each supplier, the components supplied by the respective supplier are shown as leaves. See FIG. 6.

Figure 5:
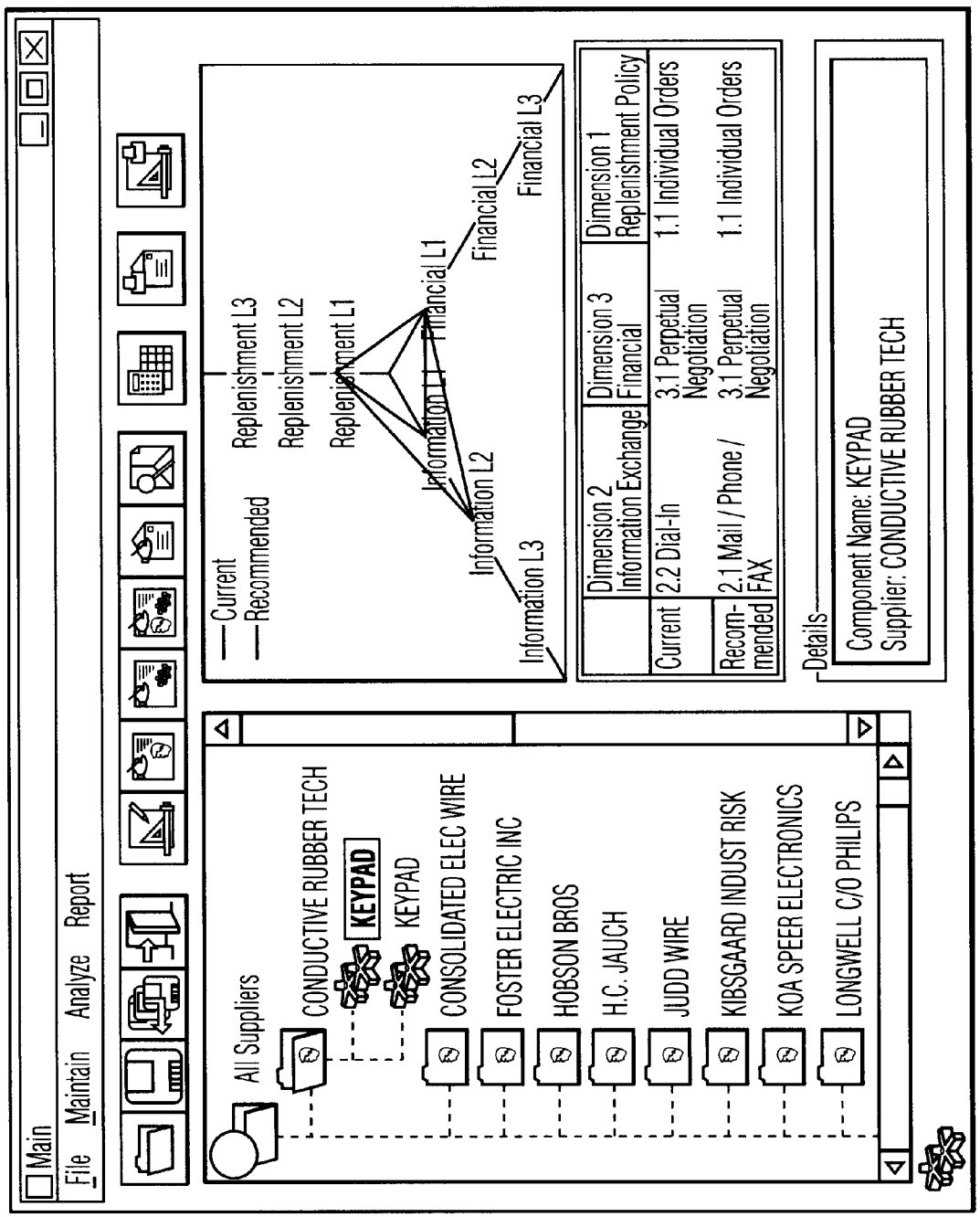
FIG. 5 illustrates a window on a computer screen depicting the main interface screen with the N-dimensional material planning method and corresponding system according to the present invention.
Figure 7:
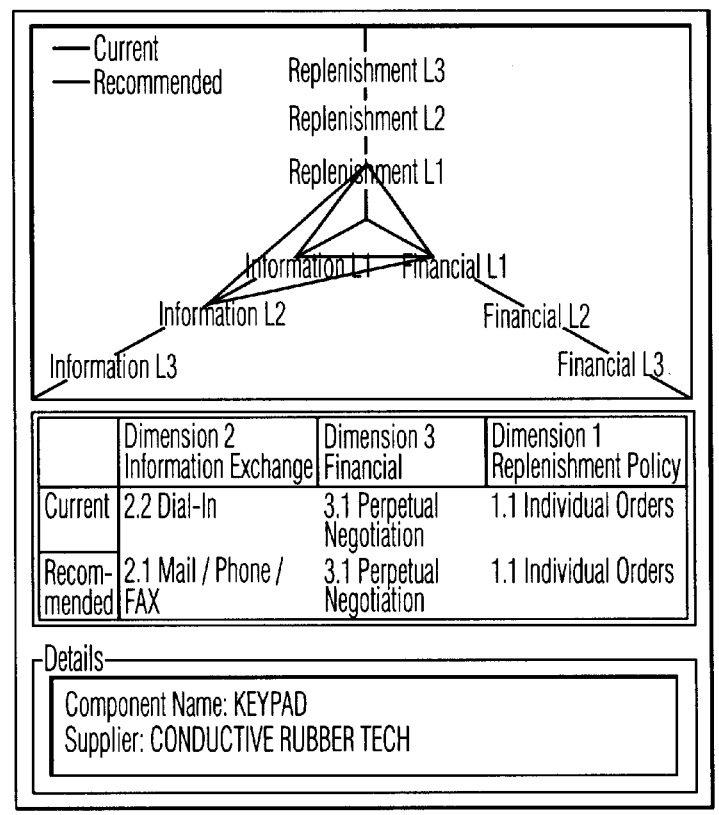
FIG. 7 illustrates a computer screen window showing both the current and recommended characterization of a selected supplier-component in both graphic and text representations.
Figure 8:
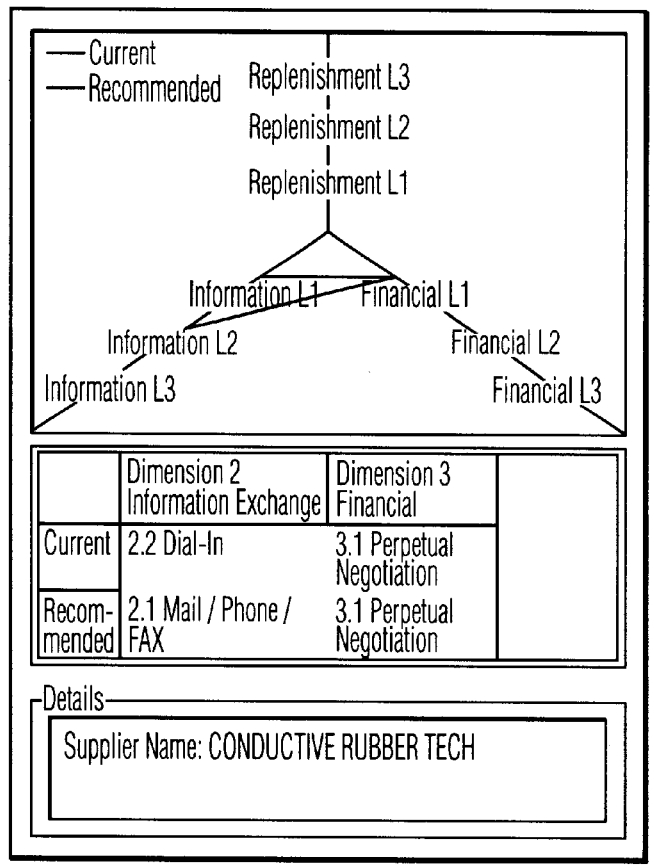
FIG. 8 is an illustration of a computer screen window showing both the current and recommended characterization of a selected supplier in both graphic and text forms.
Figure 9:
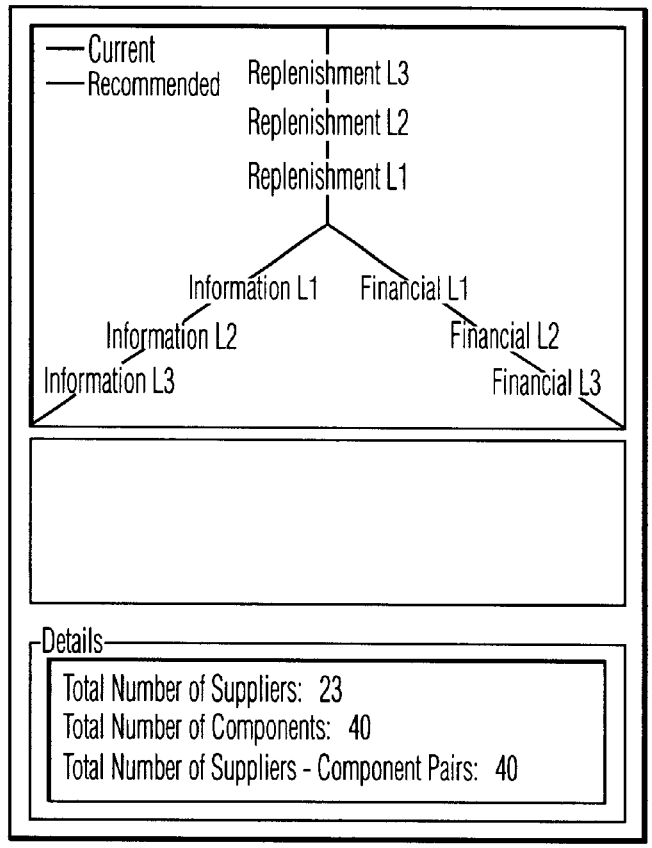
FIG. 9 illustrates a computer screen window depicting both text and graphic analysis results for all component-supplier combinations.

As illustrated in FIGS. 7–9, the right hand side of the Treeview display provides the status information related to the selection in the Treeview depicted in FIG. 5. The three basic dimensions of material, information and cash flows are graphically represented in the status graph area. Below the status graph area, a status grid displays the same information textually. Below the status grid, a status Textbox displays summary or detailed information corresponding to the selection in the Treeview.

Figure 6:
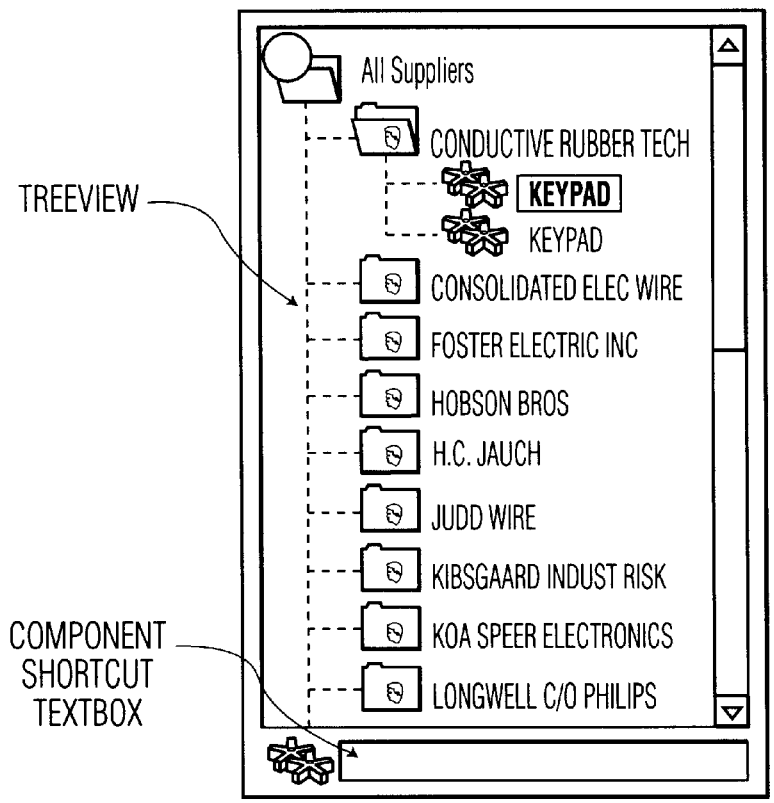
FIG. 6 is an illustration of a window on a computer screen depicting the supplier-component organization according to the present invention.

It will be appreciated that the user can easily move around in the Treeview to select different suppliers or components. This navigation can be accomplished by using a mouse or the keyboard. Double-clicking on a folder in the Treeview toggles the folder opened or closed. In FIG. 6, for example, the supplier folder of CONDUCTIVE RUBBER TECH is open, while the folder for CONSOLIDATED ELEC WIRE is closed. It will be appreciated that the user can also move to the next displayed folder or leaf by typing in the name of the folder or leaf. In an exemplary case, the user can first click in the component shortcut Textbox and then type the name of the component to quickly move to the location of a component.

The N-dimensional material planning method menus, command buttons, and status display are closely interrelated to the current selection in the Treeview. That is, based on whether a component, supplier, or all the suppliers are selected, as well as the actual selection, the availability and functions of the commands are different. Similarly, the status information that is reflected in the status graph, status grid, and the status Textbox corresponds to the selection in the Treeview.

As mentioned above with respect to FIGS. 7–9, the status information is displayed in the status graph, status grid, and the status Textbox areas. As described earlier, the status information is dependent on the selection in the Treeview. The following subsections describe the nature of these status areas based on the type of selection in the Treeview.

Referring to FIG. 7, when a component is selected in the Treeview, the status graph represents the current and recommended policies on all three dimensions, i.e., the current and recommended material replenishment policies for the component, as well as the current and recommended information exchange mode and financial arrangement terms for the supplier of the chosen component are graphically displayed. It should be mentioned that when a pointing device is activated, i.e., when a button on the mouse is clicked, in the status graph area, the legend for the nearest option on the selected dimension is displayed. It will be noted that the status grid displays the same information textually, with the first row displaying the current policies and the second row displaying the recommended policies. Additionally, the status Textbox displays the relevant information for the component including its name and name of its supplier.

Referring to FIG. 8, when only a single supplier is selected in the Treeview, the status graph represents the current and recommended policies on the two dimensions representing information exchange and financial arrangement, as the material replenishment policies depend specifically on the component characteristics, i.e., the characteristics of the supplied components. Thus, only the current and recommended information exchange mode and financial arrangement terms for the selected supplier are graphically displayed. Furthermore, the status grid displays the same information textually. The first row displays the current policies while the second row displays the recommended policies. As with the status graph, only information corresponding to information exchange mode and financial arrangement are displayed when a supplier is selected. Moreover, the status Textbox displays all relevant information for the selected supplier.

Referring to FIG. 9, when the ALL SUPPLIERS folder is selected, only the background dimensions of the various dimensions are displayed in the status graph. The current and recommended policies are not displayed as these depend on the choice of the supplier and component. For the same reason, the status grid is left blank when the ALL SUPPLIERS folder is selected. Preferably, the status Textbox displays summary information such as the number of suppliers, number of components, and the number of supplier-component pairs when the ALL SUPPLIERS folder is selected.

It should be mentioned that, in an exemplary case, the N-dimensional material planning method and corresponding system are interactive decision support devices having a user interface designed according to Windows standards. The various commands can be invoked by using the menus or the command buttons in the toolbar. Advantageously, the tool bar buttons can be made to display tool-tips when the mouse pointer is positioned above the button. A summary of the available menu commands and the corresponding toolbar buttons, if available, is shown in FIG. 10.

As discussed inn detail above, the N-dimensional material planning method rule-based expert system provides decision support functionality using the survey responses to a set of questions. An exemplary questionnaire can consist of more than fifty questions, each of which is carefully and systematically designed such that appropriate recommendations to the material planning policy can be derived based on the answers. The possible formats of the responses to the questions used in the questionnaire advantageously can be as follows:

(1) Number—numeric expression representing units, dollar amount, dimension, distance etc.;
(2) String—a free text with a limit of 255 characters;
(3) Date—a calendar date represented in MM/DD/YY format; and
(4) Choice—a response to a multiple choice question, for example, "regular", "moderately variable", or "erratic". Sometimes a Choice response is converted from a Number response.

The contents of the questions will be discussed in greater detail below.

As previously mentioned, the N-dimensional material planning method is a rule-based expert system that uses quantitative methodologies to evaluate a set of responses to a questionnaire based on pre-defined rules selected by the user and area experts. It must be reliable and consistent to support the final recommendation. It must also be flexible as additional knowledge, which can facilitate the decision support, can easily be modeled by expert rules and incorporated into the evaluation process without the need for additional re-programming. The N-dimensional material planning method is intelligent in the sense that it will try to make the most sense out of the data available, i.e., it allows fuzziness in the evaluation process for cases where the input data may be incomplete.

The N-dimensional material planning method advantageously can be provided with a set of pre-defined knowledge rules to assist the Company in its decision-making. There are two type of knowledge rules. The first set of rules is called the Binary Rules. These rules give a clear cut, 0-1, picture to either include or exclude a particular option of policy in the final recommendation. It will be appreciated that the binary rules may be either positive binary rules, which narrow the evaluation output significantly, or negative binary rules, which prevent the formation of a recommendation. The second type of knowledge rules is called the Weighting Rules. These rules assign weights to each response to each valid question in each option at the valid dimension. Detailed descriptions of the Binary Rules and Weighting Rules can be found below. It should be noted that the binary rules take precedence over the weighting rules. Moreover, it should noted that these rules collectively capture the knowledge of an expect in the field of supply policy.

Advantageously, the major difference between the binary rules and the weighting rules is the following. When N-dimensional material planning method evaluates the responses and finds that one of the binary rules applies, then the corresponding policy will be either excluded from or included in the options for the final recommendation. In contrast, for weighting rules, the N-dimensional material planning method keeps the total weight of the responses to all questions for each option at each dimension, with the weight adjusted according to the importance of the individual questions, that is, the Question Weight, which will be discussed in greater detail below.

As discussed above, the first type of the knowledge rules applied by the N-dimensional material planning method is the Binary Rules. These rules give a clear cut decision to either include or exclude a particular option of policy in the final recommendation. For example, if the answer to a particular question, "What is the Companies usage pattern for this specific component over the model year?" for a particular component is "Erratic", then the Just-In-Time replenishment policy is out of the question for that component because a steady consumption of components is a prerequisite of the JIT philosophy. Preferably, the built-in binary rules are defined in the "Binary Rule List" table in the N-dimensional material planning method database, as discussed in greater detail below.

Moreover, the second type of the knowledge rules is called the Weighting Rules. These rules assign weights to each response to each valid question in each option at the valid dimension. For example, the same "Erratic" answer to question mentioned above would contribute 0 to JIT, 60 to Min/Max, and 40 to individual orders levels in the replenishment policies dimension. If the answer is "Moderately Variable", then the weight distribution will be 10 for JIT, 70 for Min/Max, and 20 for individual orders. It will be noted that the weight distribution always sums to 100 for all options at each dimension unless the rule does not apply in a particular dimension, in which case the weight should be 0 for all options. The built-in weighting rules are defined in the "Weighting Rule List" table in the N-dimensional material planning method database, as discussed in greater detail below.

As previously mentioned, the N-dimensional material planning method and corresponding system advantageously can be employed to evaluate supply policies for a selected component-supplier pair, for a selected supplier and for all suppliers. Each of these evaluations will be discussed in greater detail below.

The user advantageously can employ the N-dimensional material planning method to analyze a single Supplier- Component pair by highlighting the Supplier-Component pair the user wishes to analyze from the Treeview in the main window by, e.g., clicking the Supplier-Component pair. It will be appreciated that if the component is not shown, the user advantageously can double click the supplier sub-folder icon to display the components supplied by that supplier. Alternatively, when the name of the component is known, the user can click on the Textbox on the lower-left of the main window and enter the name of the component. See FIG. 5. Thereafter, the user selects "Current" from the Analyze menu or clicks on the "Analyze" icon on the Toolbar to begin the analysis process. A progress window advantageously can display progress until the Supplier-Component pair evaluation has been completed. When the evaluation is complete, the N-dimensional material planning method redraws the new recommendation, as depicted in FIG. 7.

Furthermore, the user advantageously can analyze all of the components supplied by a single supplier at one time. To do so, the user simply highlights the sub-folder for the supplier the user wants to analyze from the Treeview in the main window by clicking the Supplier. It will be appreciated that when the supplier is not shown in the Treeview, the user advantageously can double click the All Suppliers folder icon to display all of the suppliers contained therein. It should be noted that the amount of time that the N-dimensional material planning method takes to evaluate all Supplier-Component pairs for that particular supplier will depend upon the total number of Supplier-Component pairs. The results of the analysis are illustrated in FIG. 8, as discussed above.

Additionally, the user advantageously can analyze all of the components supplied by all supplier all at once. To do so, the user simply highlights the All Supplier icon, or, from the Treeview in the main window by clicking the All Suppliers folder. It should again be mentioned that the time the N-dimensional material planning method takes to evaluate all Supplier-Component pairs will depend upon the total number of Supplier-Component pairs.

It will be noted that there are many data items required to support the N-dimensional material planning method. All of these data items are stored in a database, which, in an exemplary case, can be a Microsoft Access database, form a number of lists specifically designed to support the N-dimensional material planning method. This section describes the tables and their relationships defined in the N-dimensional material planning method data files.

In an exemplary case, a sample N-dimensional material planning method database labeled "MatPlanDB.mdb" is provided with the N-dimensional material planning method and corresponding system. When the user begins a N-dimensional material planning method session, an initial screen will require the user to select and open an existing database that has ".mdb" in its filename extension. Once the selected N-dimensional material planning method database is open, the program will make a copy of the database, put it in the selected working directory under the name "MatPlan.rbr". Any editing performed according to the procedures described below will be made immediately to "MatPlan.rbr".

Figure 12:
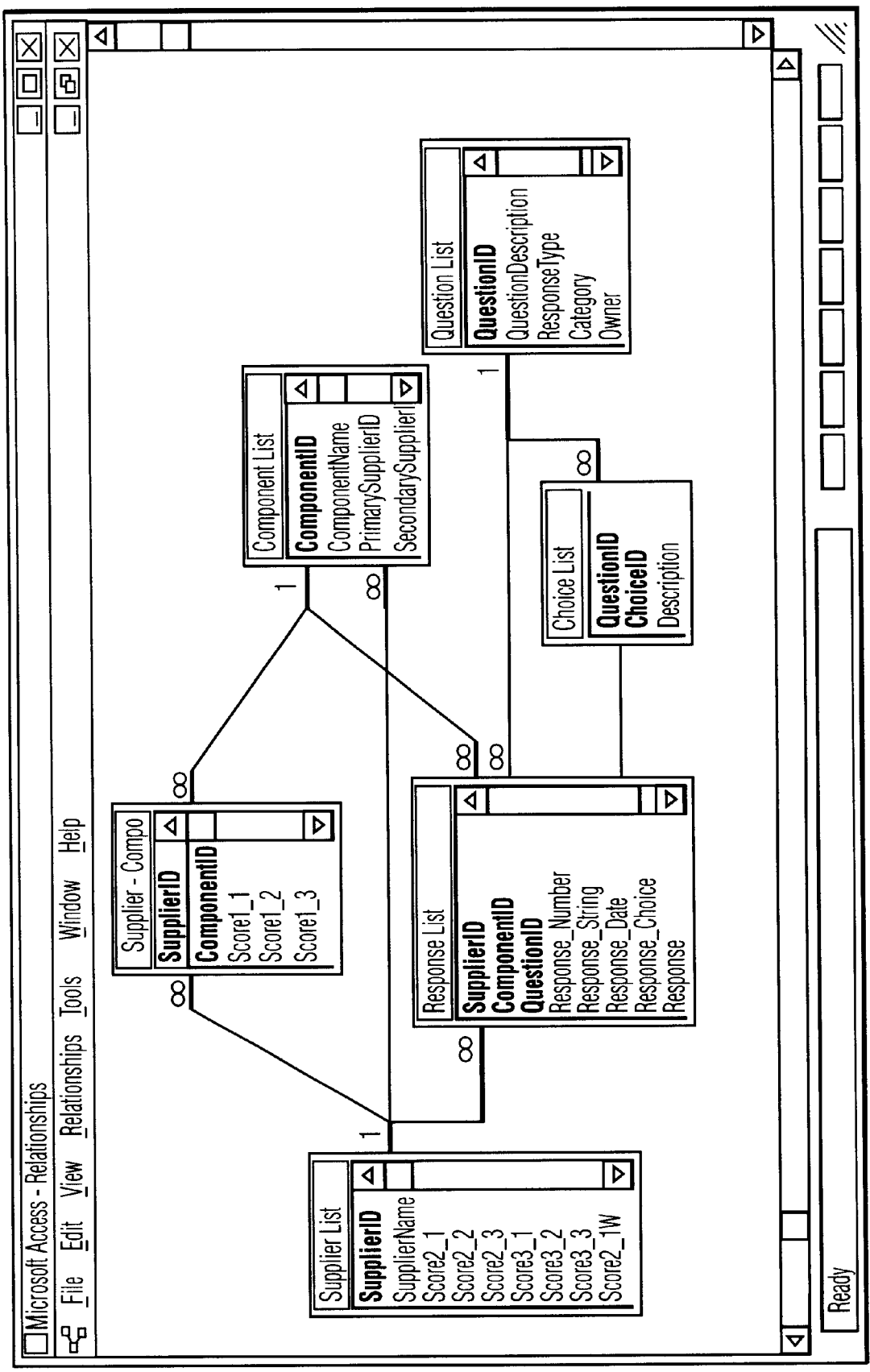
FIG. 12 illustrates a computer screen window graphically portraying the relationships maintained between the lists of characterizing data.

Referring now to FIGS. 11 and 12, a typical N-dimensional material planning method database file created from the original "MatPlanDB.mdb" should contain several pre-defined tables, as illustrated in FIG. 11. In order to maintain the database integrity, the database relationships illustrated in FIG. 12 are pre-defined and enforced in N-dimensional material planning method data file created from "MatPlanDB.mdb". It will be appreciated that all relationships enforce referential integrity, cascade update related fields and cascade delete related records, except the relationship between ChoiceID in "Choice List" and Response_Choice in "Response List". This implies that if the user wants to add a record to the Supplier-Component List table, the corresponding SupplierID and ComponentID must be entered in the "Supplier List" and "Component List" tables, respectively. This ensures that all records in the database are accurate. Enforcing cascade update of related fields means that if the user decides to update a SupplierID in the "Supplier List" table, all of the corresponding records belonging to that particular supplier in the "Supplier-Component List" and "Response List" tables will have the updated SupplierID. Similarly, by enforcing cascade deletion of related records means that if the user decides to delete a supplier in the "Supplier List" table, then all of the corresponding records belonging to that supplier in the "Supplier-Component List" and "Response List" tables will be automatically deleted.

Maintenance of a typical N-dimensional material planning method database is discussed in further detail immediately below with respect to FIGS. 13A–13D, which illustrate editable computer screen windows in which Supplier data, component data, Supplier-Component data, and Response data, respectively, advantageously can be maintained. It will be appreciated that individual data items are edited by highlighting either selected item(s) or a blank portion of the selected list table and then typing the new information. More specifically, when data regarding a specific supplier requires updating, that supplier is highlighted in the Treeview in the N-dimensional material planning method main window. Once a specific supplier is highlighted, the user either selects Supplier Data from the Maintain menu bar or activates, i.e., clicks, the Maintain Supplier Data icon from the Toolbar. Additionally, when the user desires to maintain all component suppliers, the user highlights "All Suppliers" in the Treeview. In any event, when data editing is complete, the data maintenance window can be closed, in an exemplary case, by activating the window's Close button(s).

It will be appreciated from the discussion above that the user may have added a new supplier but that the newly-added supplier does not appear on the Treeview. This is because the N-dimensional material planning method refreshes its Treeview from the records in the "Supplier-Component List" table. Thus, the user must complete the necessary procedures to add a new component and a new Supplier-Component pair in the "Component List" and "Supplier-Component List" tables, respectively. Once the user completes these procedures, the Treeview will display the new supplier and component. In contrast, when the user deletes a supplier or changes the name of a supplier, the Treeview section of the N-dimensional material planning method's main window will reflect of the changes immediately after the user closes the "Maintain Supplier Data" window.

With respect to FIG. 13B, when one or more components are to be edited, the user must highlight the component(s) that the user desires to edit from the Treeview in the N-dimensional material planning method main window. When all components are to be maintained, the user must highlight "All Suppliers" in the Treeview; when all the components supplied by a particular supplier require maintenance, then the user must highlight the particular supplier in the Treeview. Once a supplier is highlighted, the user initiates the editing process be either selecting Component Data from the Maintain menu bar or activating the Maintain component data icon on the Toolbar. When the data editing is complete, the activated editing window advantageously can be closed as described above.

It should be mentioned that when the user has just added a new component, the component does not immediately appear on the Treeview, since the N-dimensional material planning method refreshes its Treeview from the records in the "Supplier-Component List" table. The user must complete the procedures required to add a new Supplier-Component pair in the "Supplier-Component List" table. Once the user completes these procedures, the Treeview will display the new supplier and component. In contrast, when the user deletes a component or changes the name of a component, the Treeview in the N-dimensional material planning method's main —window will reflect the changes immediately after the user closes the Maintain Component Data window because of the above-mentioned cascade updates to the "Supplier-Component List".

Referring specifically to FIG. 13C, in order to maintain a Supplier-Component pair, the user first highlights the supplier or component the user wants to edit from the Treeview in the N-dimensional material planning method main window. When the user want to maintain all Supplier-Component pairs, the user must highlight "All Suppliers" in the Treeview. When the user wants to maintain all Supplier-Component pairs for a particular supplier, the user must highlight the particular supplier in the Treeview. Once at least one Supplier-Component pair has been highlighted, the user advantageously can maintain the data items in the "Supplier-Component List" table by either selecting Supplier - Component Data from the Maintain menu bar or activating the Maintain Supplier-Component data icon from the Toolbar. When the data editing has been completed, the Supplier-Component Data window can be closed as discussed above.

It will be appreciated that when the user adds or delete a new Supplier-Component pair, the Treeview in the N-dimensional material planning method's main window will refresh and display the updated data immediately after the user closes the Maintain Supplier-Component Data window. It will also be appreciated that, in the exemplary case, the user must make sure the supplier and the component have been added in sequence to the "Supplier List" and "Component List" tables before the user adds a new Supplier-Component pair. If neither the supplier nor the component can be found in the corresponding tables, the new Supplier-Component data that the user just entered will be ignored by N-dimensional material planning method.

Referring now to FIG. 13D, it should be mentioned that the user will not usually want to maintain the data in the "Response List" table directly, since there is a high probability that any change made to the data in the "Response List" table may not be compatible with the expectations of the N-dimensional material planning method, thus causing a wrong recommendation when the Analyze function is invoked at a later time. The preferred alternative for maintaining the Response list is to perform a full or partial import of the response data.

As mentioned above, responses from an external database advantageously can be imported into the N-dimensional material planning method database. It should be mentioned that the external database does not need to be in the format of the N-dimensional material planning method template database "MatPlanDB.mdb", since the N-dimensional material planning method's built-in Import function advantageously is flexible enough to support both full import and partial import functions. Full import means that all of the responses for all questions will be imported. Partial import, on the other hand, allows the user to select only those responses to particular questions to be imported. Aside from the flexibility in selecting the amount of information to be imported, the import function associated with the N-dimensional material planning method also allows the user to select from one of the following data replacement options while the data is being imported, these options being:

(1) Replace duplicate data and add new data;
(2) Delete all existing data and add new data; or
(3) Preserve existing data and add new data.

It should be mentioned that when the N-dimensional material planning method imports data, it always compares the new data with the database to determine whether or not there is a duplicate record. If there is a duplicate record, the N-dimensional material planning method will perform the option (Replace, Delete or Preserve as shown above) according to the user's selection. When the N-dimensional material planning method finds that the new data is a new supplier, a new component or both, the "Supplier List", "Component List" and "Supplier-Component List" tables will be updated appropriately. The mechanics of the Import function will be readily apparent to persons with an average familiarity with Windows95 and, in the interest of brevity, will not be discussed further.

Direct manipulation of the data in the "Response List" table is considered to be a final resort where there are no other ways to modify certain data. In the event that the Response List requires editing, the user must highlight the supplier or the component that the requires editing from the Treeview in the N-dimensional material planning method main window. When the user wants to maintain the full response list of all components supplied by all supplier, the user must highlight "All Suppliers" in the Treeview; when the user desires to maintain all components supplied by a particular supplier, then the user must highlight the particular supplier in the Treeview. Once a supplier or a component is highlighted, the user can maintain the data items in the "Response List" table by either selecting Response from the Maintain menu bar or activating the Maintain Response Data icon from the Toolbar. When editing is complete, the Response List window can be closed in the normal manner.

As noted above, one of the significant aspects of the N-dimensional material planning method according to the present invention is that the rationale underlying the generated analysis and recommendation(s) can be easily reviewed. Moreover, the recommendations generated by the N-dimensional material planning method advantageously can be either accepted or overridden at the user's discretion. These aspects according to the present invention will be discussed immediately below.

Figure 14:
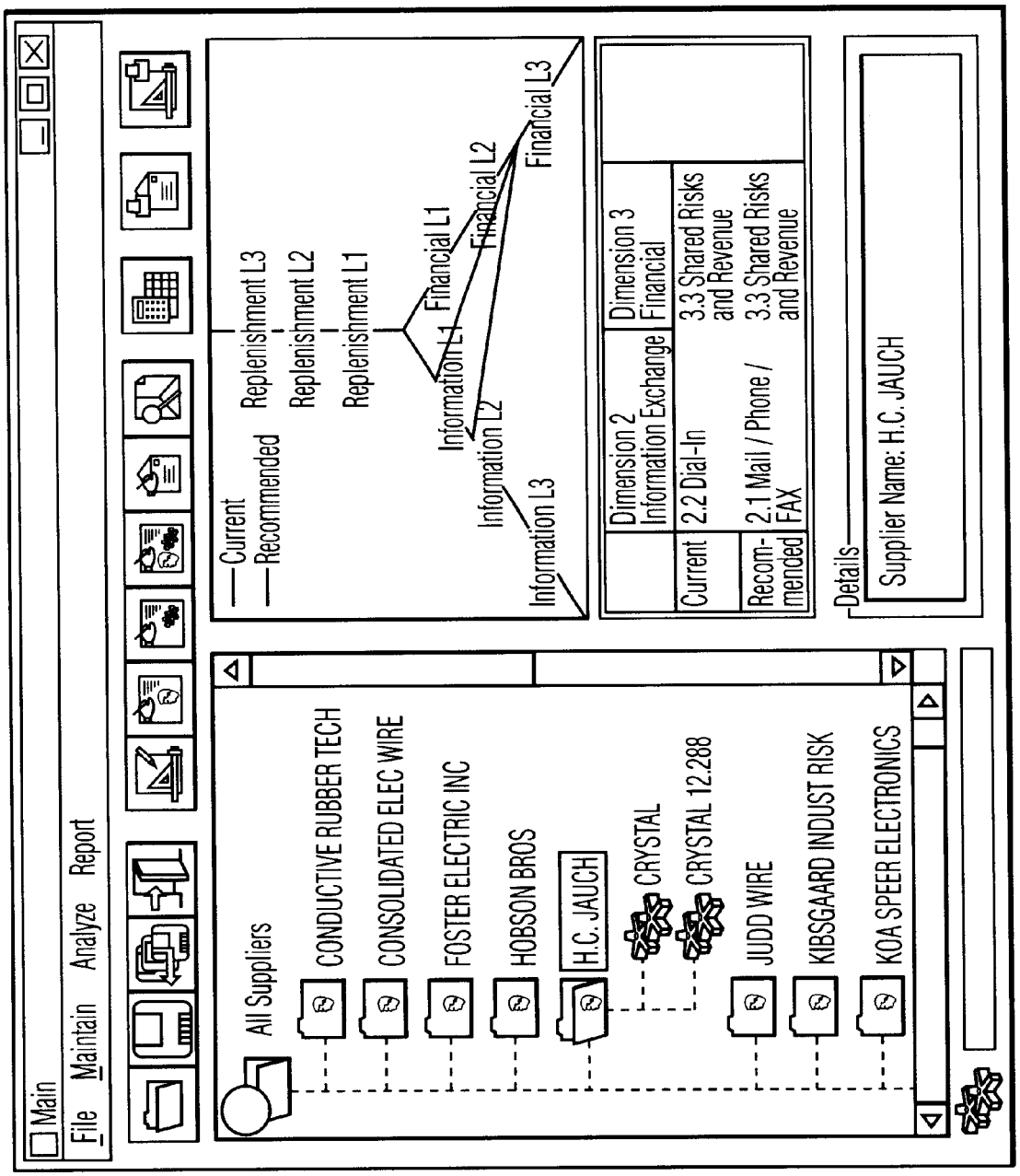
FIG. 14 illustrates a main computer screen window wherein a supplier is evaluated in accordance with the present invention.

Beneficially, the N-dimensional material planning method allows the user to maintain the recommendations interactively, by allowing the user to review, drill-down, accept or override the recommendations. As with most other commands in the exemplary system, the Maintain Recommendations command is context-sensitive; moreover, it is accessible only when a supplier or component is highlighted. For example, when a Supplier is selected from the N-dimensional material planning method main window, as shown in FIG. 14, only the dimensions of Information Exchange and Financial Arrangement are specific to the supplier and, thus, only these two dimensions are shown in window depicted in FIG. 15. It will be appreciated that the window screen of FIG. 15 describes the options for each of the dimensions and the scores given by each of the weighted rules and the binary rules. It should be mentioned that the icon shown to the right of the weighted or binary scores for each of the options allows the user to "drill-down" to review the rules producing the score. For example, activating the icon next to Binary Rule score of 1 for EDI for Dimension 2 brings up the reports illustrated in FIGS. 16 and 17.

Figure 18:
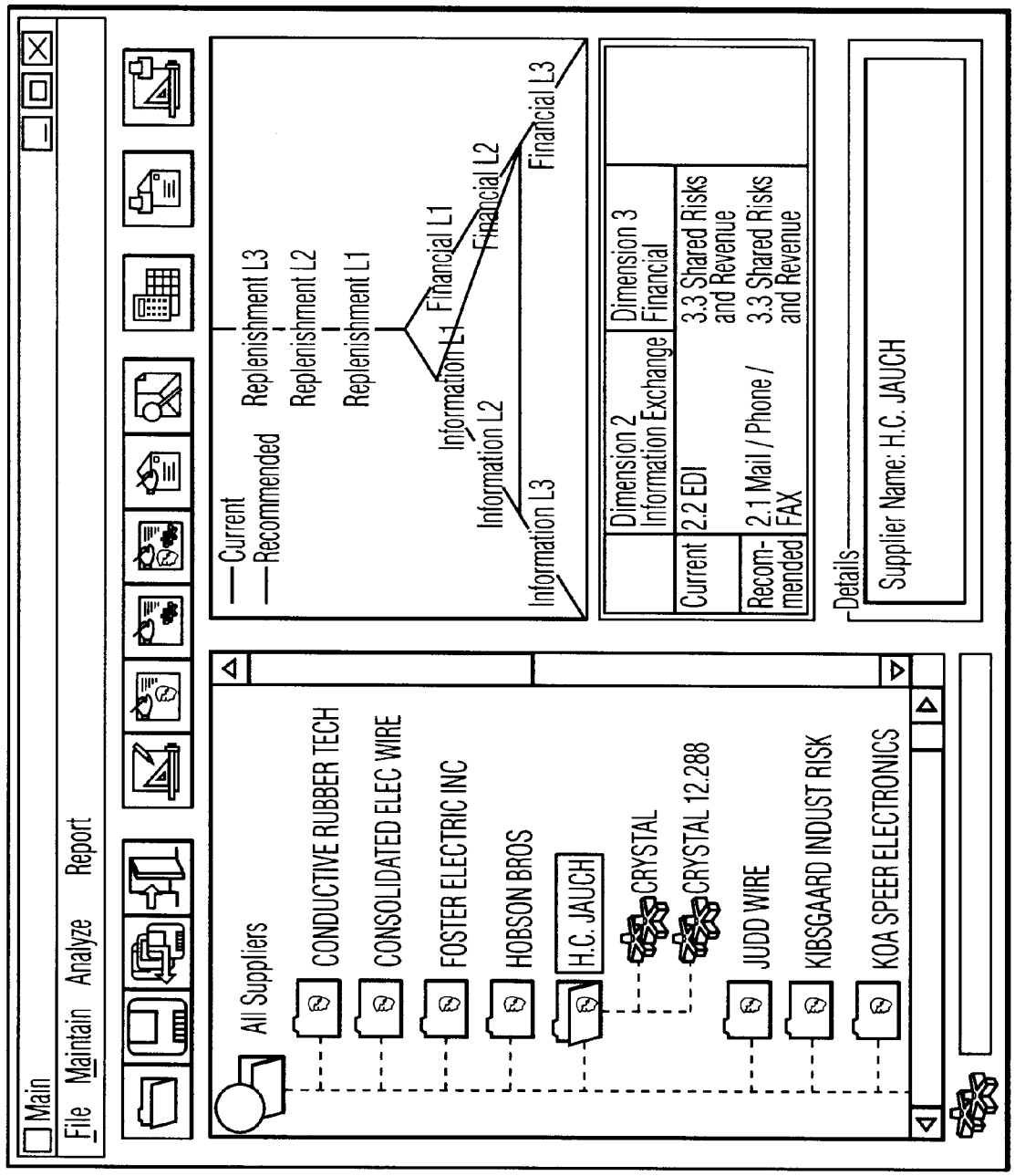
FIG. 18 illustrates a computer screen window wherein the recommendations generated by the N-dimensional material planning method of the present invention are overruled.

The report illustrated in FIG. 16 shows the list of binary rules; the list can be scrolled as required. It will be appreciated that the binary rule causing a choice of 1 for EDI is the response to Question 2.7A in the Supplier survey. The user can readily switch to the report of FIG. 17, which advantageously shows a complete list of all the questions asked in the Supplier survey. Further details regarding Question 2.7A can be obtained from the report of FIG. 17 by scrolling down to the portion of the report where Question 2.7A is visible. From the description of the question, it is evident that EDI is recommended for this supplier as there is already an active EDI implementation for that supplier. If this input data is incorrect, the user can perform maintenance on the response and rerun the analysis. If the response is correct, and the user want to accept the recommendation to implement EDI for information exchange with this supplier, the user activates the radio button corresponding to EDI under Recommended/User Choice screen illustrated in FIG. 15, and selects the Make Current option. It should be mentioned that when the user closes the window illustrated in FIG. 15 by, for example, selecting Close, the Treeview is immediately updated to reflect the choice of EDI as the current choice for this supplier, as shown in FIG. 18.

Figure 19:
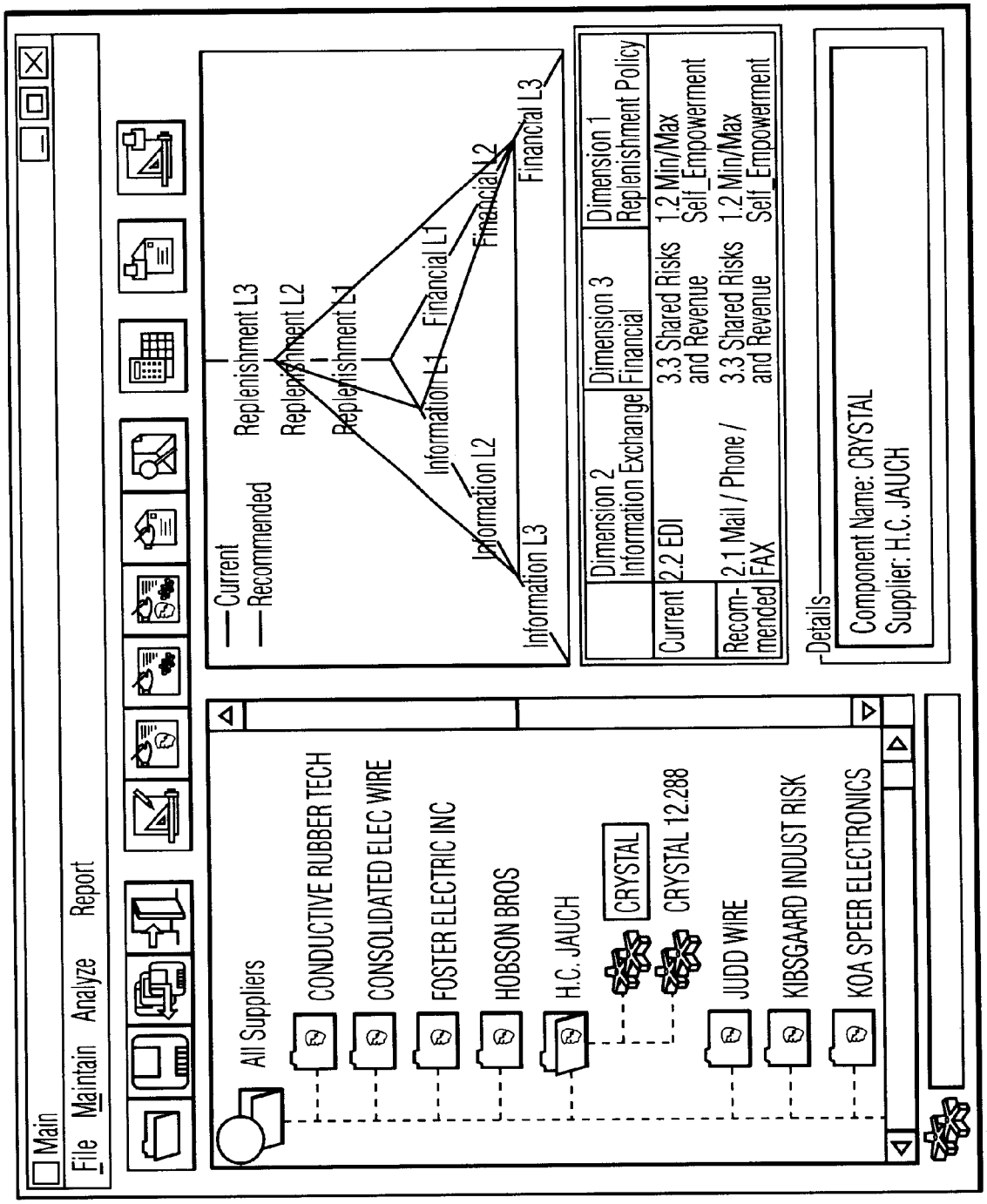
FIG. 19 illustrates a main computer screen window wherein a supplier-component pair is evaluated in accordance with the present invention.

Referring now to FIGS. 19–20, when a Component is selected for analysis, a component provided a supplier is selected by navigating the Treeview, as shown in FIG,. 19. In order to invoke the Maintain Recommendations screen, the user either selects Recommendations from the Maintain menu bar or activating the Review Recommendations icon from the Toolbar. This brings up the Maintain Recommendations screen depicted in FIG. 20. It will be appreciated that all three dimensions representing information exchange, financial arrangement, and replenishment policy are shown for the selected Supplier-Component pair. From this point on, drilling down and maintenance of recommendations can be performed as described immediately above.

Advantageously, since the N-dimensional material planning method according to the present invention provides significant user interaction capability, it will be appreciated that the user beneficially can assign and edit the weights assigned to the individual questions in the Supplier survey. There are two types of weights associated with the individual questions. The first type is the Question Weight attached to each survey question. Advantageously, the N-dimensional material planning method employs Question Weight to rank the importance of each question. More specifically, the Question Weight all three dimensions, i.e., replenishment policy, information exchange and financial arrangement. The second type of weight employed by the N-dimensional material planning method is the score attached to the response to category at each dimension listed in the "Category Weight Table" in the Maintain Weight window depicted in FIG. 21. Advantageously, the Category Weight Table serves as a look up table for scoring the response in each defined category. It should be mentioned that the total weight for all of the categories associate with a particular dimension preferentially total 100, unless the response has no effect in that dimension, in which case the total weight should be set to 0.

Figure 22:
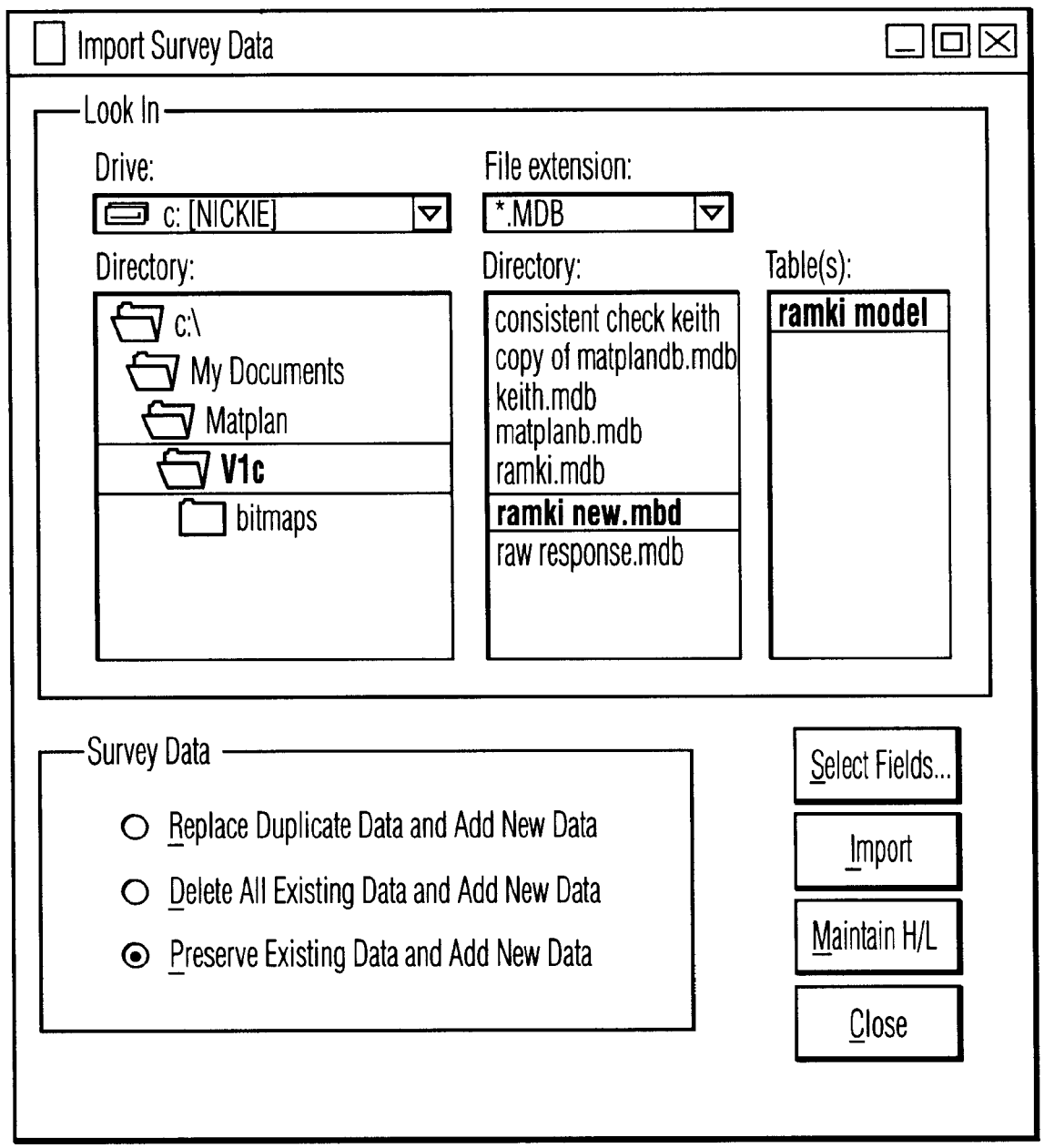
FIG. 22 illustrates a computer screen window which is useful when importing supplier characterization data.

It should be mentioned here that the Import function provides the option of Maintaining high and low (Maintain H/L) threshold values during performance of the import function. The reason for requiring the high-low threshold values in the first place is that, in some cases, the responses of the survey questions are numbers. But while performing the evaluation process in accordance with the N-dimensional material planning method, the N-dimensional material planning method converts those numbers to distinct categories, such as, high, medium, and low. To facilitate this, the database employed by the N-dimensional material planning method uses a "High-Low List" table as a look-up table while importing survey data, thus converting the numbers in the import data into corresponding categories automatically. There may be situation where the high, medium and low values need to be updated. To do so, the user can activate the Maintain H/L button shown in FIG. 22 in the Import Survey Data window to bring up the new Maintain High-Low Table depicted in FIG. 23.

Figures 23, 24:
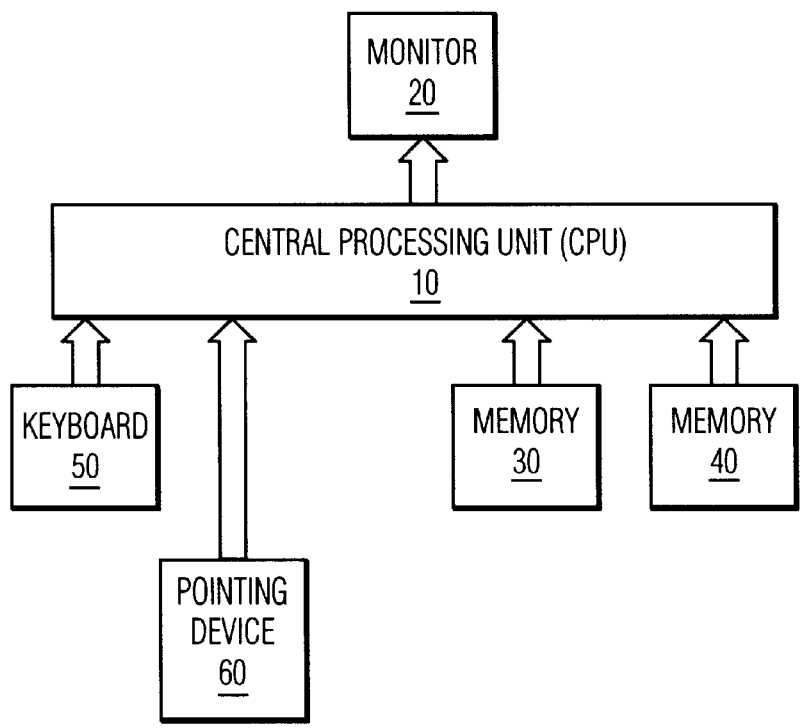
FIG. 23 illustrates a computer screen window which is useful in understanding high-low determinations.
FIG. 24 is a high level block diagram of a computer system adapted to perform the N-dimension material planning method according to the present invention.

In FIG. 23, "Index" denotes a sequence number for all of the questions. The numbers in the "Low" and "High" columns dictate how the responses in the survey data is to be translated into the high, medium, and low categories. If the number of a response is not greater than the "Low" number then the response is assigned a "Low" category. If the number of a response is not less than the "High" number then the response is assigned to a "High" category. If neither case is true, then the response has a "Medium" category.

Although the discussion above regarding the present invention was restricted to addressing supplier characterization in three dimensions, it will be appreciated that the present invention is not so limited. Additional dimensions, e.g., a transportation dimension, advantageously can be defined to further characterize each supplier, and all such multi-dimensional space characterization and evaluations are considered to be within the scope of the present invention. Moreover, although the above discussion focused on an N-dimensional material planning method implemented using the Windows95 operating system and compatible programs, e.g., Visual Basic, Version 4.0, the inventive method and corresponding system is not restrict to either a specific operating system or a specific programming language. The inventive method advantageously can be written, in an exemplary case, in JAVA and run on any hardware platform capable of implementing the JAVA virtual machine. The inventive method can also be implemented on other hardware-software combinations, and all such combinations fall within the scope of the present invention.

In an exemplary case, the N-dimensional material planning method advantageously can be implemented on a personal computer, such as that illustrated in FIG. 24, which depicts a central processing unit 10 operatively connected to a monitor 20 and memories 30 and 40. Preferably, the CPU 10 receives real time inputs from keyboard 50 and pointing device, e.g., mouse, 60.

Advantageously, the memory 30 can be a hard disk drive while memory 40 can be a replaceable drive, such as floppy disk drive, a compact disk read only memory (CD-ROM) or rewrittable compact disk (CD-RW) drive. It will be appreciated that the memory 40 advantageously stores the operating program and data for implementing the N-dimensional material planning method on the computer. Thus, the memory 40 is a storage medium which stores computer-readable instructions for converting a general purpose computer into a N-dimensional material planning evaluation system. It will also be appreciated that memory 40 advantageously can be located remote from the CPU 10, e.g., the memory 40 may be located in a network server (not shown).

Figure 25:
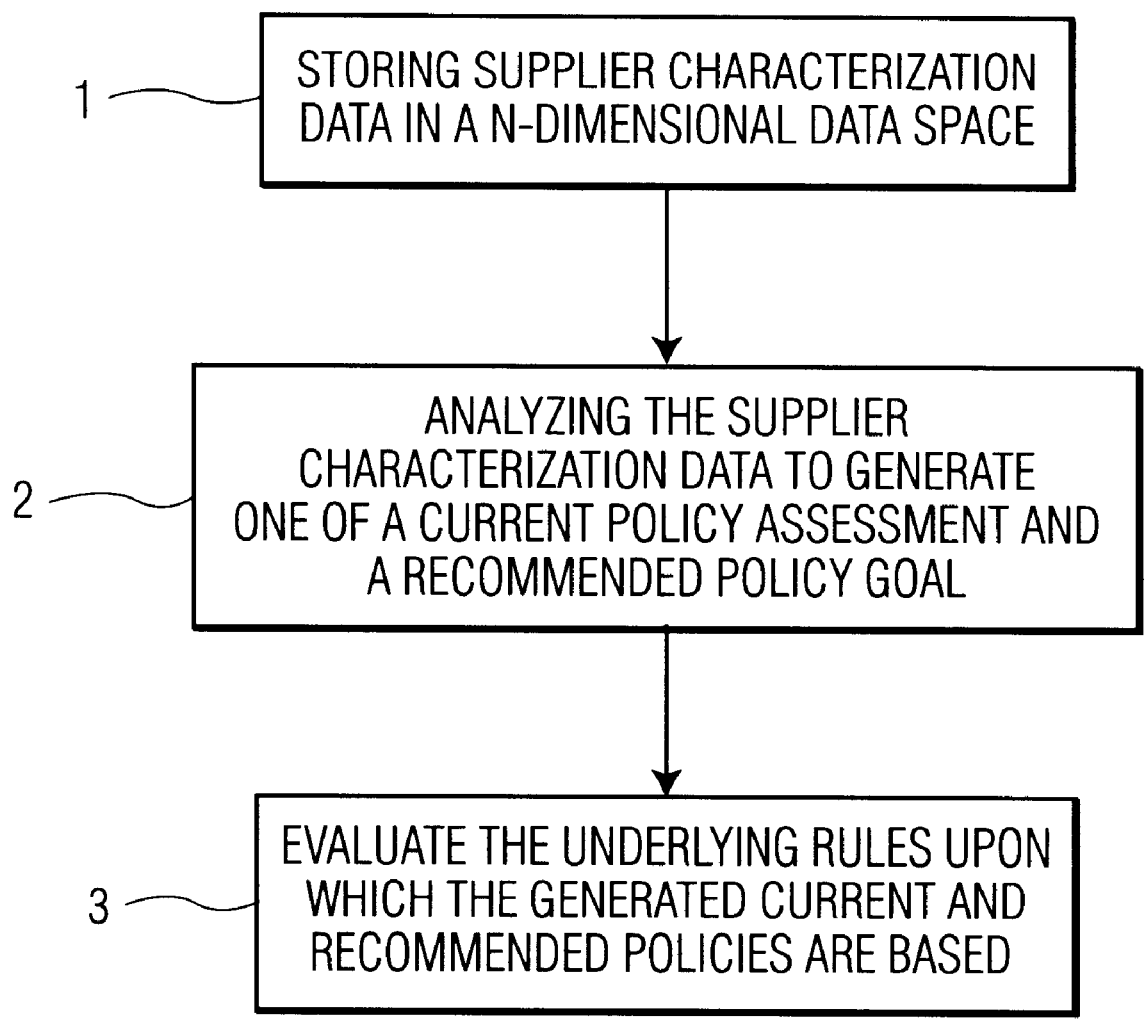
FIG. 25 is a flowchart of a preferred embodiment of the N-dimensional material planning method according to the present invention.

In summary, the N-dimensional material planning method according to the present invention includes steps for (1)

storing supplier characterization data in a N-dimensional data space, and (2) analyzing the supplier characterization data to generate at least one of a current policy assessment and a recommended policy goal. In addition, the N-dimensional material planning method permits the user to evaluate the underlying rules upon which the generated current and recommended policies are based. See FIG. 25. As noted above, the N-dimensional material planning method advantageously can evaluate supply policies using by binary and weighted rules. Preferably, these two types of rules can be applied simultaneously.

Thus, although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A storage medium which stores computer readable instructions for permitting a computer to store supplier characterization data in an N dimensional data space and to evaluate said supplier characterization data to thereby generate at least one of a current supply policy assessment and a recommended supply policy goal, wherein said at least one of said current supply policy assessment and said recommended supply policy goal is displayed as an intersection between said N dimensional data space and a surface.

2. The storage medium as recited in claim 1, wherein said surface comprises a plane.

3. The storage medium as recited in claim 1, wherein said storage medium is a hard drive disposed in a computer.

4. A storage medium which stores computer readable instructions for permitting a computer to store supplier characterization data in an N dimensional data space, to evaluate said supplier characterization data to thereby generate at least one of a current supply policy assessment and a recommended policy goal, to display selected portions of said supplier characterization data indicative of the generated said at least one of a current supply policy assessment and a recommended policy goal in responsive to user commands, wherein said at least one of said current supply policy assessment and said recommended supply policy goal is displayed as an intersection between said N dimensional data space and a surface.

5. The storage medium as recited in claim 4, wherein said surface comprises a plane.

6. The storage medium as recited in claim 4, wherein said storage medium is a hard drive disposed in a computer.

7. The storage medium as recited in claim 4, wherein said storage medium is a hard drive located remote from a computer displaying said at least one of said current supply policy assessment and said recommended supply policy goal as an intersection between said N dimensional data space and a surface.

8. A N dimensional material planning method for evaluating supplier material policy, comprising steps for:
    storing supplier characterization data in a N dimensional data space; and
    evaluating said supplier characterization data using predetermined rules to thereby generate at least one of a current supply policy assessment and a recommended policy goal, wherein said evaluating step comprises evaluating said supplier characterization data using predetermined rules including binary rules and weighting rules to thereby generate said at least current policy assessment and said recommended policy goal.

9. The N-dimensional material planning method as recited in claim 8, further comprising:
    analyzing said predetermined rules upon which said at least one of said current policy assessment and said recommended policy goal are based.

10. The N-dimensional material planning method as recited in claim 8, where N is an integer greater than two.

11. The N-dimensional material planning method as recited in claim 8, wherein said binary rules have precedence over said weighting rules.

12. A 3-dimensional material planning method for evaluating supplier material policy, comprising steps for:
    storing supplier characterization data in a 3-dimensional data space;
    evaluating said supplier characterization data using predetermined rules to thereby generate at least one of a current supply policy assessment and a recommended policy goal; and
    displaying related ones of said predetermined rules corresponding to said at least one of a current supply policy assessment and a recommended policy goal, wherein said evaluating step comprises evaluating said supplier characterization data using predetermined rules including binary rules and weighting rules to thereby generate said at least one of a current supply policy assessment and a recommended policy goal.

13. The 3-dimensional material planning method as recited in claim 12, further comprising the step of:
    displaying said at least one of said current supply policy assessment and said recommended supply policy goal.

14. The 3-dimensional material planning method as recited in claim 13, wherein said at least one of said current supply policy assessment and said recommended supply policy goal is displayed as an intersection between said 3-dimensional data space and a planar surface.

15. The 3-dimensional material planning method as recited in claim 12, wherein said binary rules have precedence over said weighting rules.

16. A computer system implementing an N-dimensional material planning method for evaluating supplier material policy, comprising:
    means for storing supplier characterization data in a N-dimensional data space; and
    means for evaluating said supplier characterization data using predetermined rules to thereby generate at least one of a current supply policy assessment and a recommended policy goal, wherein said evaluating means comprises:
    means for evaluating said supplier characterization data using predetermined rules including first means for applying binary rules; and second means for applying weighting rules, wherein said first and second means cooperatively generate said at least one of a current supply policy assessment and a recommended policy goal.

17. The computer system as recited in claim 16, further comprising:
    means for analyzing said predetermined rules upon which said at least one of said current policy assessment and said recommended policy goal are based.

18. The computer system as recited in claim 16, where N is an integer greater than two.

19. The computer system as recited in claim 16, wherein said first means has precedence over said second means.

20. A computer system performing a 3-dimensional material planning method for evaluating supplier material policy responsive to stored computer readable code, comprising:

a first device which stores supplier characterization data in 3-dimensional data space;

a second device which evaluates said supplier characterization data using predetermined rules to thereby generate at least one of a current policy assessment and a recommended policy goal, wherein said second device evaluates said supplier characterization data using predetermined rules including binary rules weighting rules to thereby generate said current policy assessment and said recommended policy goal; and third device which displays related said predetermined rules corresponding to said at least one of said current supply policy assessment and said recommended policy goal.

21. The computer system as recited in claim 20, further comprising:

a fourth device which graphically displays said at least one of said current supply policy assessment and said recommended supply policy goal.

22. The computer system as recited in claim 21, wherein said at least one of said current supply policy assessment and said recommended supply policy goal is displayed on said fourth device as an intersection between said 3 dimensional data space and a planar surface.

23. The computer system as recited in claim 20, wherein said binary rules have precedence over said weighting rules.

24. The computer system as recited in claim 20, further comprising:

a fourth device which graphically displays said at least one of said current supply policy assessment and said recommended supply policy goal, wherein:

said at least one of said current supply policy assessment and said recommended supply policy goal is displayed on said fourth device as an intersection between said 3 dimensional data space and a planar surface, said second device evaluates said supplier characterization data using predetermined rules including binary rules and weighting rules to thereby generate said at least one of said current policy assessment and said recommended policy goal, and said binary rules have precedence over said weighting rules.

* * * * *